United States Patent
Koscal et al.

(12) 
(10) Patent No.: US 6,412,081 B1
(45) Date of Patent: Jun. 25, 2002

(54) SYSTEM AND METHOD FOR PROVIDING A TRAP AND PATCH FUNCTION TO LOW POWER, COST CONSCIOUS, AND SPACE CONSTRAINED APPLICATIONS

(75) Inventors: Michael E. Koscal, Aliso Viejo; Douglas M. Berger, Las Flores, both of CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/232,881

(22) Filed: Jan. 15, 1999

(51) Int. Cl.[7] .............................................. G06F 11/26
(52) U.S. Cl. ........................... 714/34; 714/35; 714/38; 712/244; 710/266
(58) Field of Search ............................. 714/34, 35, 36, 714/38, 3; 712/227, 244; 710/266, 267; 713/1, 2; 717/4

(56) References Cited

U.S. PATENT DOCUMENTS

| | | | |
|---|---|---|---|
| 3,771,146 A | * 11/1973 | Cotton et al. | 340/172.5 |
| 5,701,506 A | 12/1997 | Hosotani | |
| 5,790,856 A | * 8/1998 | Lillich | 395/703 |
| 5,790,860 A | * 8/1998 | Wetmore et al. | 395/705 |
| 5,799,144 A | 8/1998 | Mio | |
| 5,983,000 A | * 11/1999 | Perron | 714/8 |
| 6,006,030 A | * 12/1999 | Dockser | 395/568 |
| 6,189,145 B1 | * 2/2001 | Bellin, Jr. et al. | 717/11 |
| 6,199,134 B1 | * 3/2001 | Deschepper et al. | 710/129 |
| 6,253,317 B1 | * 6/2001 | Knapp, III et al. | 712/244 |

* cited by examiner

Primary Examiner—Scott T. Baderman
(74) Attorney, Agent, or Firm—Howrey Simon Arnold & White, LLP

(57) ABSTRACT

A system and method for providing a software trap and patch function to low power, cost conscious, and space constrained applications. When a programming error in a first memory is discovered, a data structure comprising a trap address, patch code, and patch address are stored in a second memory. A power-on-reset process detects the presence of the data structure, and in response thereto, enables the trap and patch function. In operation, upon the occurrence of a trap condition, the first memory is disconnected from the data bus and a predetermined instruction circuit is activated. Upon activation thereof, the predetermined instruction circuit, which comprises solely combinational circuitry, places the op code of the predetermined instruction on the data bus. In one embodiment, in which the predetermined instruction is a software interrupt instruction, a predetermined bit of the PSR is placed in a defined state responsive to the occurrence of a trap condition. Upon execution of the software interrupt instruction, the processor executes an interrupt request service routine. There, the predetermined bit of the PSR is examined to see if it is in the predefined state. If so, and the interrupt was caused by a trap condition in contrast to a software interrupt, the service routine causes the processor to execute the patch code in place of the error-containing code. If not, signifying a hardware interrupt, another service routine is executed.

32 Claims, 17 Drawing Sheets

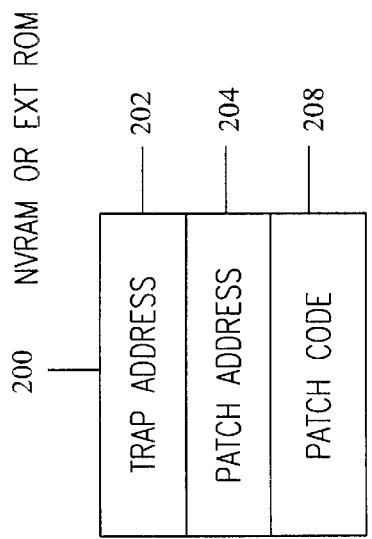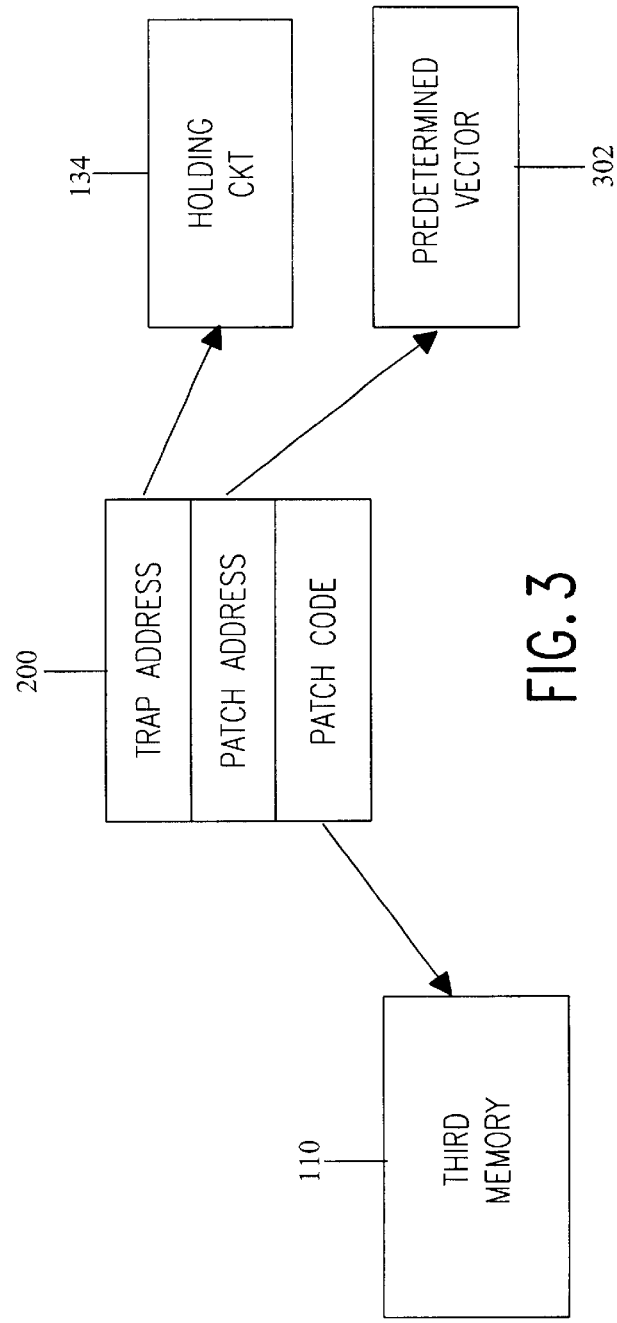

| 7 | 6 | 5 | 4 | 3 | 2 | 1 | 0 |
|---|---|---|---|---|---|---|---|
| N | V | NOT USED | B | D | I | Z | C |

Bit 7     NEGATIVE (N)[1]
1     Negative value
0     Positive value

Bit 6     OVERFLOW (V)[1]
1     Overflow set
0     Overflow cleared

Bit 5     NOT USED
1

Bit 4     BREAK (B)
1     Break command
0     No Break command

Bit 3     DECIMAL MODE (D)[3]
1     Decimal mode selected
0     Binary mode selected Bit 2     INTERRUPT DIABLE (I)[2]
1     IRQ interrupt disabled
0     IRQ interrupt enabled Bit 1     ZERO (Z)[1]
1     Zero results
0     Non-zero results Bit 0     CARRY (C)[1]
1     Carry set
0     Carry cleared Notes: 1. Not initialized by RES.
          2. Set to a 1 by RES.
          3. Reset to a 0 by RES.

FIG. 7

| Mnemonic | Instruction | Mnemonic | Instruction |
|---|---|---|---|
| ADC | Add Memory to Accumulator with Carry | MPA* | Mulitiply and Accumulate |
| ADD* | Add Memory to Accumulator without Carry | MPY* | Multiply |
| AND | 'AND' Memory with Accumulator | | |
| ASL | Shift Left One Bit (Memory or Accumulator) | NEG* | Negate Accumulator |
| ASR* | Accumulator Shift Right One Bit, Sign Extend | NOP | No Operation |
| | | NXT* | Next Instruction |
| BAR* | Branch On Bit(s) Reset | | |
| BAS* | Branch On Bit(s) Set | ORA | 'OR' Memory with Accumulator |
| BBR* | Branch On Bit Reset (8) | | |
| BBS* | Branch On Bit Set (8) | PHA | Push Accumulator on Stack |
| BCC | Branch on Carry Clear | PHI* | Push I on Stack |
| BCS | Branch on Carry Set | PHP | Push Processor Status on Stack |
| BEQ | Branch on Equal | PHW* | Push W on Stack |
| BIT | Test Bits in Memory with Accumulator | PHX* | Push Index X on Stack |
| BMI | Branch on Minus | PHY* | Push Index Y on Stack |
| BNE | Branch on Not Zero | PIA* | Pull I from Stack, Load Accumulator |
| BPL | Branch on Plus | PLA | Pull Accumulator from Stack |
| BRA* | Branch Always | PLI* | Pull I from Stack |
| BRK | Break Command | PLP | Pull Processor Status from Stack |
| BVC | Branch on Overflow Clear | PLW | Pull W from Stack |
| BVS | Branch on Overflow Set | PLX* | Pull Index X from Stack |
| | | PLY* | Pull Index Y from Stack |
| CLC | Clear Carry Flag | PSH* | Push A, X and Y on Stack |
| CLD | Clear Decimal Mode | PUL* | Pull Y, X and A from Stack |
| CLI | Clear Interrupt Disable Bit | | |
| CLV | Clear Overflow Flag | RBA* | Reset Bit(s) in Memory |
| CLW* | Clear W Register and Overflow Flag | RMB* | Reset Memory Bit (8) |
| CMP | Compare Memory and Accumulator | RND* | Round |
| CPX | Compare Memory and Index X | ROL | Rotate Left One Bit (Memory or Accumulator) |
| CPY | Compare Memory and Index Y | ROR | Rotate Right One Bit (Memory or Accumulator) |
| | | RTI | Return from Interrupt |
| DEC | Decrement Memory by One | RTS | Return from Subroutine |
| DEX | Decrement Index X by One | | |
| DEY | Decrement Index Y by One | SBA* | Set Bit(s) in Memory |
| | | SBC | Subtract Memory from Accumulator with Borrow |
| EOR | 'Exclusive-Or' Memory with Accumulator | SEC | Set Carry Flag |
| EXC* | Exchange Accumulator and Memory | SED | Set Decimal Mode |
| | | SEI | Set Interrupt Disable Status |
| INC | Increment Memory by One | SMB* | Set Memory Bit (8) |
| INI* | Increment I by One | STA | Store Accumulator in Memory |
| INX | Increment Index X by One | STI* | Store Immediate to Memory |
| INY | Increment Index Y by One | STX | Store Index X in Memory |
| | | STY | Store Index Y in Memory |
| JMP* | Jump to New Location | | |
| JPI* | Jump Indirect with Return in I | TAW* | Transfer Accumulator to W |
| JSB* | Jump to Subroutine (8) | TAX | Transfer Accumulator to Index X |
| JSR | Jump to New Location Saving Return Address | TAY | Transfer Accumulator to Index Y |
| | | TIP* | Transfer I to Program Counter |
| LAB* | Load Absolute to Accumulator | TSX | Transfer Stack Pointer to Index X |
| LAI* | Load Accumulator Indirect through I | TWA* | Transfer W to Accumulator |
| LAN* | Load Accumulator Indirect and Increment I | TXA | Transfer Index X to Accumulator |
| LDA | Load Accumulator with Memory | TXS | Transfer Index X to Stack Pointer |
| LDX | Load Index X with Memory | TYA | Transfer Index Y to Accumulator |
| LDY | Load Index Y with Memory | | |
| LII* | Load I Indirect through I | | |
| LSR | Logical Shift Right One Bit (Memory or Accumulator) | * = New instruction or addressing mode | |

FIG. 8

| Cycle | Address Bus | Program Counter | Data Bus | Comments |
|---|---|---|---|---|
| 1 | 2200 | OP CODE | Fetch OP CODE | Finish previous instruction, Increment PC to 2201 |
| 2 | 2201 | Next OP CODE | Fetch Data (Ignored) | Force BRK instruction, Increment PC to 2202 |
| 3 | 01FF | PCH | Store PCH on Stack | Decrement SP to 01FE |
| 4 | 01FE | PCL | Store PCL on Stack | Decrement SP to 01FD |
| 5 | 01FD | P | Store P on Stack | Decrement SP to 01FC |
| 6 | FFF0 | New PCL | Fetch Vector Low | Put Away Stack |
| 7 | FFF1 | New PCH | Fetch Vector High | Vector Low |
| 8 | PCH, PCL | OP CODE | Fetch Interrupt Program | Increment PC to PC + 1 |

FIG.11

Trap and Patch Related Source Code

```
;*******************************************************************************
; UPDATE_OEM_CONFIG
;       The Existence of parallel external ROM or serial NVRAM is provided in the
;       flags.
;       If there is a ROM, reads config byte and decodes. If no ROM or
;       no configuration set, and if NVRAM exists, reads config byte and decodes.
;       Then if no configuration is set, exit the routine.
;       This routine should be executed in start up.
;*******************************************************************************
            PROCDURE        UPDATE_OEM_CONFIG, GLOBAL IF_FIELD    PROM_EXIST,SET
                IF_FIELD    OEM_FROM_EXIT_ROM,SET       ;Configuration is in external ROM
                LDX         #<P_BLOCK_LEN+4             ;Include trap and patch addresses
PROM_COPY_LOOP:
                LDA         EXT_PARAMETER_BLOCK-1,X
                STA         TEMP_PARAM_BLOCK-1,X
                DEX
                IF_NOT_ZERO PROM_COPY_LOOP
OEM_COMPLETE:
                JMP         SET_TRAP_IF_ENABLED         ;Initialize trap and patch
                END_IF
            END_IF IF_FIELD    NVRAM_EXIST,CLR
                RETURN
            END_IF
            IF_FIELD    OEM_FROM_NVRAM,CLR
                RETURN
            END_IF ;Configuration is in NVRAM!
            WR#F        NVRAM_WRITE_FLAG,CLR            ;NVRAM read operation ;Read RAM_CODE_LEN bytes from NVRAM, beginning at 100h, and store them to RAM
;beginning at RAM_CODE_START.
            LDA #$00                                    ;Starting address in NVRAM, low byte
            LDX #$01                                    ;Starting address in NVRAM, high byte
            LDY #RAM_CODE_LEN                           ;# of bytes to be read
            STI <RAM_CODE_START,CID_CONST_ADDR          ;destination address
            STI >RAM_CODE_START,CID_CONST_ADDR+1
            JSR NRAM_POR_BLOCK_READ ;Read OEM configuration, including trap and patch addresses.
            LDA         #<EEP_PARAMETER_BLOCK           ;Starting address in NVRAM, low byte
```

FIG. 12a

LEGEND

| a |
|---|
| b |
| c |

Trap and Patch Related Source Code

```
    LDX    #>EEP_PARAMETER_BLOCK        ;Starting address in NVRAM, high byte
    LDY #P_BLOCK_LEN+4                  ;# of bytes to be read
    STI <TEMP_PARAM_BLOCK,CID_CONST_ADDR     ;destination address
    STI >TEMP_PARAM_BLOCK,CID_CONST_ADDR+1
    JSR NRAM_POR_BLOCK_READ
    BRA OEM_COMPLETE ;*******************************************************************************
;        NVRAM Block Read at POR
;        input: A,X: source address in NVRAM
;               Y:   # of bytes to be read
;               (CID_CONST_ADDR): destination address in RAM
;               Flag NVRAM_WRITE_FLAG cleared
;*******************************************************************************

PROCEDURE       NRAM_POR_BLOCK_READ
    STY EXTAPP_LCD_MSG_ADDR          ;total # of bytes to be read LDY #0                            ;Y = # of OEM parameters loaded
    STY TEMP_PARAM_CHECKSUM
NVRAM_BLOCK_READ_CONTINUE:
    STA NVRAM_ADDR_LOW
    STX NVRAM_ADDR_HIGH

CPY EXTAPP_LCD_MSG_ADDR
    IF_NOT_CARRY

PSH                           ;save A, X
        TYA

ADD    #26
        CMP    EXTAPP_LCD_MSG_ADDR
        LDA    #26                    ;read up to 26 bytes each time only.
                                       LDA doesn't affect CARRY flag!
        IF_CARRY
           LDA EXTAPP_LCD_MSG_ADDR
           SBC TEMP_PARAM_CHECKSUM    ;CARRY is set by CMP
        END_IF
        STA    NVRAM_COUNTER
        PHA CLC
        ADC    TEMP_PARAM_CHECKSUM    ;update # of bytes loaded
        STA    TEMP_PARAM_CHECKSUM
```

FIG. 12b

Trap and Patch Related Source Code

```
        JSR     NVRAM_DRIVERS              ;can be called directly when power-up LDX     TEMP_PARAM_CHECKSUM
        PLY                                ;# of bytes from NVRAM
        DO_WHILE
          DEX
          DEY
        IS_NOT_MINUS
          LDA NVRAM_BUFFER,Y
          STA (CID_CONST_ADDR),X
        ENDDO PUL                                ;restore A, X, Y
        ADD     #26                        ;update NVRAM address low
        IF_CARRY
          INX                              ;update NVRAM address high
        END_IF LDY     TEMP_PARAM_CHECKSUM
        BRA     NVRAM_BLOCK_READ_CONTINUE
      END_IF
      RETURN ;*******************************************************************************
;                   Trap and Patch Initialization
;*******************************************************************************
;
        PROCEDURE       SET_TRAP_IF_ENABLED        ;Initialize trap and patch IF_FIELD NO_TRAP,CLR                       ;If enabled in OEM configuration
          LDA    TEMP_TRAP_ADDRESS
          STA    TRAP_ADDRESS_LO                   ;Hardware register
          LDA    TEMP_TRAP_ADDRESS+1
          STA    TRAP_ADDRESS_HI                   ;Hardware register
          LDA    TEMP_PATCH_ADDRESS
          STA    PATCH_ADDRESS
          LDA    TEMP_PATCH_ADDRESS+1
          STA    PATCH_ADDRESS+1
          WR#F   TRAP_ENABLE,1                     ;Enable hardware trap
        END_IF
        RTS
```

FIG. 12c

Trap and Patch Related Source Code

;*********************************************************************
;
;The IRQ6 interrupt also occurs in the event of a BRK instruction. Since a break
;is used to substitute for the address programmed in the trap address registers,
;this code must check for a break condition, and if detected must jump to the
;patch address instead of doing the normal Serial Output Buffer Empty operation.
;
;*********************************************************************

```
        INTERRUPT_ROUTINE   SOB_EMPTY_INT,GLOBAL

PSH                 ;Save registers (W not used)

;Check for break.
        TSX                          ;Transfer the stack pointer to the X register
        LDA     $100+4,X             ;Read processor status
        AND     #$10                 ;Check bit 4 = break bit
        IF_NOT_ZERO                  ;Break bit set in processor status
            JMP    (PATCH_ADDRESS)
        END_IF STI     00100000B,IPR        ;Clear IRQ6 interrupt

QUEUE_TASK_FROM_INT Q_FAST, SOB_EMPTY_QPROC

;These are done by the Q_TASK_INT subroutine branched to by the macro:
;       PUL                          ;Restore registers
;       RTI                          ; and return
```

FIG.13

SYSTEM AND METHOD FOR PROVIDING A TRAP AND PATCH FUNCTION TO LOW POWER, COST CONSCIOUS, AND SPACE CONSTRAINED APPLICATIONS

BACKGROUND OF THE INVENTION

1. Field of the Invention

The present invention relates to a system and method for providing a software trap and patch function, and more specifically, a software trap and patch function to low power and space constrained applications.

2. Related Art

The microprocessor is an integral part of many modern consumer electronic devices. The microprocessor, in combination with one or more software programs, provides many of the features and functions of the consumer electronic device. Such software programs are typically stored on the microprocessor device or as a standalone device in read only memory ("ROM") and installed during the manufacturing process.

Programs that are stored in ROM cannot generally be altered. Thus, a problem occurs when it is discovered that a bug or program error exists within the pre-programmed code stored in the ROM of fabricated devices. It is prohibitively expensive to scrap devices whenever a programming error is discovered, and it would unduly delay the shipment of the product if it were necessary to ship devices fabricated with the correct ROM code.

Several solutions to this problem have been proposed. According to one such approach, detailed in U.S. Pat. Nos. 5,799,144 and 5,701,506, the microprocessor is configured with a writeable memory, such as a random access memory ("RAM") or a similar storage device, and a new section of code, referred to herein as the "patch" code, in which the programming error has been corrected, is downloaded into the writeable memory. Circuitry is provided to detect an access to the error-containing code, and responsive thereto, signal a trap condition. Responsive to the trap condition, additional circuitry imposes on the data bus a JUMP instruction, with the operand thereof being the start address of the patch code. Upon execution by the microprocessor of this JUMP instruction, program control is passed to the patch code, which is then executed in lieu of the error-containing code.

The problem with this approach is that, because of the complexity and size of the circuitry required to perform the trap and patch function, it is not particularly well-suited for low power, cost conscious and space constrained applications, such as wireless or cordless handsets. For example, in U.S. Pat. No. 5,799,144, the JUMP instruction (and its operand, the start address of the patch code) is provided to the data bus in multiple bus cycles, and control unit 8 is required to set the proper sequencing and timing with which this information is provided to the data bus. This control unit comprises a particular form of sequential circuitry known as a state machine in which the outputs thereof depend on the present state of the inputs thereof, in addition to the present "state" of the machine. For purposes of this disclosure, the definition of "sequential circuit" is taken from The IEEE Standard Dictionary of Electrical and Electronics Terms, Sixth Edition, p. 970. The power consumed, cost, and space occupied by circuitry such as this will, in many cases, render this approach unsuitable for use in low power, cost conscious and space constrained applications, such as cordless or wireless handsets.

Therefore, what is needed is a system and method for implementing a software trap and patch function that is appropriate for these low power, cost conscious, and space constrained applications.

SUMMARY OF THE INVENTION

Accordingly, the present invention provides a system and method for implementing a software trap and patch function for program code that requires only the addition of combinational circuitry to the microprocessor for purposes of placing a predetermined instruction on the data bus responsive to a trap condition and does not require the addition of any sequential circuitry such as a state machine to perform this function. As is known to those of skill in the art, a combinational circuit is one in which the outputs thereof depend only on the present state of the inputs thereof. For purposes of this disclosure, the definition of "combinational circuit" is taken from the IEEE Standard Dictionary of Electrical and Electronics Terms, Sixth Edition, p. 177.

In particular, when a programming error is discovered in program code stored in a first memory, patch code is provided in a second memory accessible by the microprocessor. In addition to the patch code, a trap address and a patch address, are also provided. The trap address is the address of the beginning of the code segment in the first memory that contains the error. The patch address is the address of the area in the second or other memory at which the patch code will reside during execution thereof. Typically, the first memory is ROM, but it should be appreciated that other forms of memory are possible. In addition, the second memory is typically non-volatile RAM ("NVRAM"), electronically-erasable programmable ROM ("EEPROM"), or external ROM, but again, it should be appreciated that other forms of memory are possible. In one implementation, since the cost/bit of the second memory is typically greater than that of the first memory, it is not generally economically feasible to replicate the entire program code, with the bug or error corrected, in the second memory. Also, in this implementation, other distinctions between the first and second memories are that the first memory tends to be larger than the second memory, and the second memory is modified in the field. In one embodiment, the microprocessor transfers the patch code from the second memory to a third memory which is also accessible by the microprocessor. The patch code is then executed while resident in the third memory. In this embodiment, the third memory is typically RAM, but it should be appreciated that other forms of memory are possible.

The patch code is designed to replace the code segment containing the error. In one embodiment, the patch code is added by a distributor, value added reseller ("VAR"), or original equipment manufacturer ("OEM") to a second memory already being installed by the distributor, VAR or OEM to add additional features and functionality to the device. In this embodiment, the patch code is stored in the second memory as part of an integrated data structure containing the patch code, the trap address, and optionally, the start address of the patch code. In another embodiment, the second memory is already present in the device, and this data structure is downloaded to this second memory from a remote location through a wireless or other communications link, such as telephone lines or the Internet.

According to the subject invention, a power-on-reset ("POR") process is provided to detect the presence of the patch code in the second memory upon power-up of the microprocessor or upon occurrence of a reset condition. If patch code is present, pursuant to the process, the trap address is downloaded into a holding circuit, the patch address is downloaded into a predetermined patch address vector, the patch code is optionally copied into the third memory, and an enable circuit is activated to enable the trap and patch function.

A compare circuit compares addresses sent out over the address bus by the microprocessor with the contents of the holding circuit. If a match is detected, indicating an attempted access to the error-containing code in the first memory, a trap condition signal is asserted. Responsive to the occurrence of the trap condition, a disable first memory switch disconnects the first memory from the data bus. In addition, in one embodiment, a predetermined bit in the processor status register ("PSR"), which, if placed in a first state, is placed in a second state, and a predetermined instruction circuit places on the data bus the operation code of a predetermined software instruction. Preferably, the predetermined instruction circuit comprises solely combinational circuitry. In one embodiment, this circuit places the predetermined instruction on the data bus in a single bus cycle. In an implementation example of this embodiment, the predetermined instruction is a software interrupt instruction lacking any operands in which the operation code thereof is all zeroes, and the predetermined instruction circuit simply places all zeroes on the data bus upon the occurrence of a trap condition.

In accordance with the invention, when the microprocessor executes the predetermined instruction placed on the data bus, a jump is automatically made to an interrupt service routine. In this interrupt service routine, in one implementation, the predetermined bit in the PSR is examined to determine if the interrupt is a hardware interrupt. If it is in the first state, indicating that the interrupt was prompted by a hardware interrupt condition, the hardware interrupt service procedure is executed. If, however, it is in the second state, indicating that the interrupt was prompted by a trap condition or a software interrupt, the following procedure is executed. In one implementation, in the initial part of this procedure, a check is made to determine if the interrupt was caused by a trap condition or a software interrupt. In one example, this is accomplished by comparing the patch address with the address stored on the stack. If the address stored on the stack is the next sequential location following the trap address, it is determined that the interrupt was caused by a trap condition. Otherwise, it is determined that the interrupt was caused by a software interrupt.

In this manner, the software interrupt instruction need not be dedicated to the function of responding to a trap condition, and a user is not precluded from also utilizing the software interrupt instruction in program code to generate a software interrupt responsive to a user-defined condition. That is to say, the software interrupt instruction is capable of serving the dual purpose of generating a software interrupt responsive to a user-defined condition and an interrupt responsive to a trap condition.

Of course, in a scenario in which software interrupts are not supported, the foregoing step could be avoided. Also, it should be appreciated that other methods are possible for detecting whether the interrupt is a hardware interrupt. For example, a hardware interrupt could be serviced by an entirely different service routine than that used to service software interrupts or interrupts due to trap conditions. There would then be no need to determine if the interrupt is a hardware interrupt in the service routine for software interrupts or interrupts due to trap conditions.

Responsive to the predetermined bit being in the second state, a portion of the service routine responsible for responding to either a software interrupt or a trap condition is executed. First, the context of the microprocessor is optionally saved. Then, in one implementation in which software interrupts are supported, the address stored on the stack is compared with the patch address to determine if the address stored on the stack is the next sequential address following the patch address, indicating that the interrupt was caused by a trap condition. (In another implementation, in which software interrupts are not supported, this step could be avoided, as it could safely be assumed that a trap condition caused the interrupt.) If a software interrupt caused the interrupt, the software interrupt service routine is executed, while, if a trap condition caused the interrupt, the start address of the patch code is retrieved from the predetermined patch address vector, and stored in the program counter ("PC") of the microprocessor. In this fashion, a jump to the patch code is executed. The microprocessor then executes the patch code and, when this has been accomplished, selectively restores context, and returns to an address within the first memory immediately after the program code containing the software error.

An advantage of the present invention is that it requires only the addition of combinational logic to the microprocessor for the purpose of placing a predetermined instruction on the data bus, rather than the sequential logic which characterizes conventional approaches. The result is an overall circuit design that consumes less power and requires less space and cost than the conventional approaches, and thus is more suitable for many consumer electronic devices.

Another advantage of one embodiment of the present invention is that, by distinguishing between an interrupt generated responsive to a trap condition, and a software interrupt generated upon the occurrence of a user-defined condition, the predetermined instruction, in this case, the software interrupt instruction, need not be dedicated to the function of generating an interrupt responsive to a trap condition, but can serve the additional purpose of generating a software interrupt.

Still another advantage of one embodiment of the present invention is that the software trap and patch function is implemented using a predetermined instruction that can be placed on the data bus in a single bus cycle. This eliminates the need for a state machine as required in conventional approaches to place a predetermined instruction on the data bus in multiple bus cycles.

Yet another advantage of one embodiment of the present invention is a software trap and patch system that does not require specialized circuitry to handle other interrupts, either hardware or software, that may occur during the trap and patch process.

Further features and advantages of the invention, as well as the structure and operation of various embodiments of the invention, are described in detail below with reference to the accompanying drawings.

BRIEF DESCRIPTION OF THE DRAWINGS

The present invention will be described with reference to the accompanying drawings, wherein:

FIG. 2 is a block diagram depicting a data structure useful for implementing a software trap and patch function in accordance with an embodiment of the present invention;

FIG. 3 is a block diagram depicting the destinations of the various data comprising the data structure of FIG. 2 during the initialization process in accordance with an embodiment of the present invention;

FIG. 7 illustrates the bit configuration of the PSR of the MC19;

FIG. 8 illustrates the instruction set of the MC19;

FIG. 11 illustrates certain processing steps performed in hardware upon the occurrence of a software interrupt in the MC19;

FIGS. 12a–12c are a listing of code configured for execution on the MC19 embodying an example of a method of initializing a trap and patch function in accordance with the subject invention;

FIG. 13 is a listing of code configured for execution on the MC19 embodying an example of a method of implementing a trap and patch function in accordance with the subject invention;

In the drawings, like reference numbers generally indicate identical, functionally similar, and/or structurally similar elements.

DETAILED DESCRIPTION OF THE PREFERRED EMBODIMENTS

An example environment in which the present invention may be beneficially employed is within a cordless or wireless handset. Such a device is typically operated by means of a microprocessor directed by program code stored in a ROM accessible by the microprocessor. The microprocessor is typically part of the baseband chip set, and referred to as the baseband processor. Since a device such as this tends to be a relatively low-cost consumer product, it is impractical to scrap devices or recall the same from the field or from distribution in order to correct bugs in the program code. Therefore, a trap and patch system and method would find beneficial employment in such a device. Moreover, because such a device is typically subject to rather tight space, cost and power constraints, the trap and patch system and method of the subject invention is particularly well-suited for such an environment.

However, it should be appreciated that this environment is presented by way of example only, solely to illustrate the context in which the present invention may be beneficially employed, and is not presented by way of limitation. As such, this example should not be construed to limit the scope and breadth of the present invention, and it should be appreciated that the present invention can be beneficially employed with a wide variety of electronic devices besides cordless and wireless handsets, including GPS navigational devices, compact disc players, electronic cameras and the like. It should also be appreciated that the present invention can be beneficially employed with any electronic device whose operation is at least in part controlled by any type of processor, that is, a machine configured to perform a discrete series of operations responsive to a sequence of instructions executable by the processor and stored in a memory accessible by the processor. Such a processor may include, but is not limited to, a microprocessor, microcontroller, baseband processor, digital signal processor, or central processing unit ("CPU").

Figure 1:
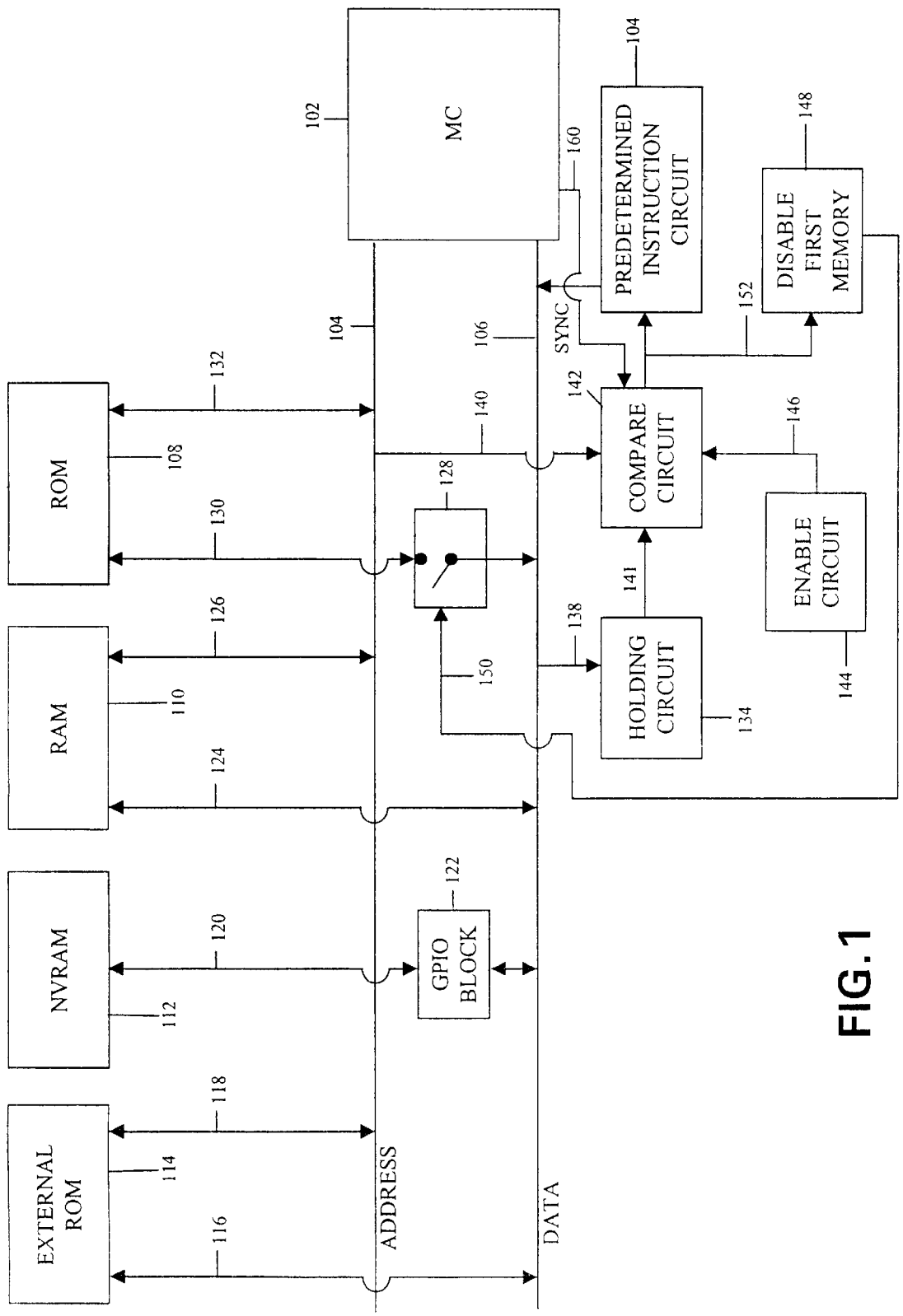
FIG. 1 is a block diagram depicting an example of an embodiment of the present invention in a typical operating environment.

FIG. 1 is a block diagram depicting an embodiment of a system configured in accordance with the present invention. As shown, a microprocessor 102 is configured with address bus 104 and data bus 106. An internal ROM 108 is coupled with the data bus 106 and the address bus 104 via the ROM data bus 130 and the ROM address bus 132, respectively. The internal ROM is used to store the program code which directs the operation of microprocessor 102.

A RAM 110 is coupled with the data bus 106 and the address bus 104 via the RAM data bus 124 and the RAM address bus 126, respectively. The RAM 110 is used as temporary and working storage.

In this embodiment, an external ROM 114 is also provided. The external ROM 114 is coupled with the data bus 106 and the address bus 104, via the external ROM data bus 116 and the external ROM address bus 118, respectively. In one embodiment, the external ROM 114 is added by a distributor, original equipment manufacturer ("OEM"), value added reseller ("VAR") or the like to provide additional features and functions to the electronic device over and above those already provided to the device by component manufacturers situated upstream in the distribution chain. In the case of a cordless handset, such features may include call forwarding, speed dialing, caller ID or the like. For simplicity, the term "OEM" is used hereinafter to collectively refer to distributors, OEMs and VARS. It should be appreciated by those of skill in the art that the term "external," as used herein to refer to memory, means a memory that is added to an existing processor system, that is, a processor coupled to at least one memory, referred to herein as "internal" memory, over a bus system comprising, in one embodiment, a data bus and an address bus, and which is thereafter equally accessible by the processor as the internal memory.

In the alternative, or in addition, to external ROM 114, a non-volatile RAM ("NVRAM") 112 is also provided in one embodiment. Like the external ROM 114, the NVRAM 112 may be added by an OEM to provide additional functionality over and above that provided by upstream component manufacturers, or it may already be present in the device when it reaches the OEM in the distribution chain. In one implementation example, the NVRAM is replaced by EEPROM.

The NVRAM 112 is coupled with the data bus 106 via a general purpose input/output ("GPIO") block 122. In this example, the GPIO block 122 provides an interface between the serial data format typically required by the NVRAM 112 and the parallel format of the data bus 106. That is to say, it converts the serial data typically provided by NVRAM 112 to the parallel data typically required by data bus 106, and vice versa.

In one embodiment, the patch code is provided in a second memory which comprises a selected one of the external ROM 114 and the NVRAM 112. In one embodiment, the patch code is retained in this second memory, and retrieved and executed by the microprocessor while retained in this memory. In another embodiment, the patch code is copied before execution to a third memory, such as RAM 110, because it provides a more convenient storage medium in which to store the patch code. For example, in the case in which the patch code is initially provided in NVRAM 112, since it is generally considered impractical to execute patch code from non-volatile RAM due to its serial nature, it is desirable to transfer the patch code to RAM 110 before execution thereof.

Holding circuit 134, compare circuit 142, enable circuit 144, predetermined instruction circuit 104, disable first memory circuit 148, and disable first memory switch 128 are also provided. The holding circuit 134 is a register, memory location, latch, flip-flop, storage element or other device used to store the trap address, that is, the start address of the code segment in a first memory, in this example, ROM 108, that contains the bug or proramming error. In one embodiment, the holding circuit 134 is coupled with the data bus 106 for loading therein of the trap address upon execution of a power-on-reset ("POR") routine of the subject invention. Details of this POR routine are described below with reference to FIG. 4. In the example illustrated, in which the first memory is internal ROM 108, the disable first memory circuit 148 is a disable ROM circuit, and the disable first memory switch 128 is a disable ROM switch.

Compare circuit 142 is coupled to the address bus 140 and the holding circuit 134. It compares the trap address stored in holding circuit 134 with the address data placed on the address bus 104 by microprocessor 102. If the two are equal, signifying that the microprocessor has attempted a memory access to the error-containing code in the first memory, the compare circuit asserts a trap condition signal on signal line 152.

In one implementation, the compare circuit 142 has two inputs 140 and 141, and a third input 160, which is a SYNC signal from the microprocessor 102 indicating, when active, that an op-code is being fetched. The first input 141 is the value stored in the holding circuit 134. The second input 140 is the data present on the address bus 104. The third input 160 is the SYNC signal indicating that an op-code is being fetched by the microprocessor. It should be noted that, in one embodiment, the width of these inputs is the same width as the address bus 104. The output of the compare circuit 142 is provided on signal line 152. The output of the compare circuit 142 changes state whenever the data on the address bus matches the value stored in the holding circuit, and the SYNC signal is active. By changing state, it is meant that the output goes from high to low, or from low to high, depending on the specific implementation of the present invention. In one embodiment, the output of the compare circuit 142 is capable of two states, a first state and a second state. According to this embodiment, the output of the compare circuit 142 is normally in the first state, and transitions to the second state upon the occurrence of a trap condition. In one implementation example, it is assumed that the output goes from low to high when a match is detected. This change in state of the output constitutes assertion of the trap condition signal.

The enable circuit 144 is coupled with the compare circuit 140 and the microprocessor 102 (this latter coupling is not shown). In the example illustrated, it is also coupled to the holding circuit 134. It is capable of being placed in a first state and a second state responsive to corresponding commands of the microprocessor. The first state indicates that the trap and patch function is deactivated, and the second state indicates that this function is activated. The state of the enable circuit is provided to the compare circuit over signal line 146. When the enable circuit 144 is in the first state, the compare circuit 142 is deactivated, that is, prevented from sending out a trap condition signal on signal line 152. Conversely, when the enable circuit 144 is in the second state, the compare circuit 142 is activated, that is, allowed to send out a trap condition signal on signal line 152 upon the occurrence of a trap condition.

The predetermined instruction circuit 104 is coupled with the compare circuit 142 and the data bus 106. Responsive to the assertion of a trap condition signal on signal line 152, the predetermined instruction circuit 104 places a predetermined instruction on the data bus. Preferably, the predetermined instruction circuit comprises solely combinational circuitry.

In one implementation, the predetermined instruction circuit is a software interrupt instruction circuit, which places on the data bus the operation code of a software interrupt instruction. In an example of this implementation, the operation code ("op code") of this software interrupt instruction is all zeroes, the software interrupt instruction lacks any operands, and the software interrupt instruction circuit is an all zeroes circuit, which places all zeroes on the data bus 106 in a single bus cycle. Thus, in this implementation example, the task of providing the op code to the data bus is greatly simplified. That is, unlike conventional systems that require the use of a sequential circuit such as a state machine to place a JUMP or other command on the data bus in multiple bus cycles, the present invention places the predetermined instruction on the data bus without the use of a sequential circuit such as a state machine. This saves cost in terms of manufacturing expense, power consumption and space requirements.

In particular, in one implementation example of the present invention, the all zeros circuit is implemented by selectively coupling all of the lines on the data bus to ground upon the occurrence of a trap condition (assuming the all zeros circuit is enabled). This can be accomplished using various techniques. In one embodiment, this is accomplished by an all zeroes circuit in the form of a plurality of tri-state buffers, in which the data inputs thereof are tied to ground, the data outputs thereof are tied to the data bus, and in which the control inputs thereof are coupled to a signal which is asserted upon the occurrence of a trap condition signal for a period of time sufficient to enable the software interrupt instruction to be placed on the data bus and recognized by the microprocessor. In this fashion, the software interrupt instruction is placed on the data bus without requiring any hardware other than the tri-state buffers. Accordingly, the goal of minimizing space and power consumption is furthered.

It should be appreciated that other means to provide zeroes to the data bus are possible that are within the scope of the present invention, and also that other predetermined single cycle instructions besides a software interrupt instruction are possible as well. For example, a JSB (jump subroutine) instruction is possible which, along with any operands thereof, such as the address of the patch code, or the address of a service routine which needs to be executed before the patch code, which are either implicit within or part of the instruction, can be placed on the data bus in a single bus cycle. Placement of the instruction on the bus in a single bus cycle is advantageous in that it avoids the need for sequential circuitry to place the instruction on the bus. The choice of which instruction is most appropriate depends on several factors, such as the CPU 102 selected to implement the present invention.

In accordance with the implementation example referred to above, in response to the placement of all zeroes on the data bus 106, representing a software interrupt instruction having an op code of all zeroes, the CPU 102 jumps to a predetermined location in ROM 108 at which begins an interrupt service routine stored in the ROM 108. In one embodiment, the address of this predetermined location is stored in a predetermined vector accessible by the microprocessor 102 during power-up or upon occurrence of a reset condition. In one implementation example, the predetermined vector is a predetermined location in the RAM 110, but it should be appreciated that other embodiments are possible in which the predetermined vector is a register, latch, flip-flop, or memory element or device accessible by the microprocessor. During execution of the software interrupt instruction placed on the data bus, the microprocessor accesses this vector to obtain the starting address of the interrupt service routine, and loads this starting address into the PC. Accordingly, program control is passed to the service routine. The benefit of this approach is that the starting address of the interrupt service routine need not be provided as an operand of the software interrupt instruction.

The disable first memory circuit 148 is coupled with the compare circuit 142 and a disable first memory switch 128. The disable first memory circuit 148 and disable first memory switch 128 are used to selectively disconnect the first memory from the data bus 106 responsive to the assertion of the trap condition signal on signal line 152. If the trap condition signal is asserted, the first memory is disconnected from the data bus, while, if the signal is not asserted, connection of the first memory to the data bus is continued. In one implementation, the disable first memory switch 128 and disable first memory circuit 148 comprise the chip select pin of ROM 108 and associated circuitry. In accordance with this implementation, the ROM 108 is decoupled from the data bus during the single cycle the predetermined instruction is placed on the data bus so that it avoids conflict with the predetermined instruction circuit 104.

In one embodiment, the predetermined instruction circuit 104 is combinational circuitry. In another embodiment, one or the other of the compare circuit 142, disable first memory circuit 148, and disable first memory switch 128 are also combinational circuitry. In a third embodiment, each of predetermined instruction circuit 104, compare circuit 142, disable first memory circuit 148, and disable first memory switch 128 are combinational circuitry.

A processor status register ("PSR") is also provided. As is known to those of skill in the art, the PSR is a register in which the status of the microprocessor is maintained. Various bits are provided which indicate such status items as whether the most recent arithmetic operation performed by the microprocessor generated a carry bit, resulted in an overflow, resulted in a zero, resulted in a negative value, and the like. Additional control bits are also typically provided, such as a bit indicating whether interrupts are enabled or disabled. In one embodiment, a predetermined bit is provided in the PSR which is capable of being placed in a first state and a second state. According to this embodiment, the particular state of the bit is determined at least in part responsive to whether an interrupt is 1) a hardware interrupt, or 2) an interrupt responsive to the assertion of the trap condition signal, or a software interrupt. In one implementation example, the first predefined state is a logical "0," and the second predefined state is a logical "1." In one embodiment, the predetermined instruction placed on the data bus responsive to the assertion of a trap condition signal is a software interrupt instruction. As will be seen, in this embodiment, the predetermined bit in the PSR is used to distinguish between 1) a software interrupt or an interrupt generated responsive to a trap condition, and 2) a hardware interrupt. In one implementation example, the predetermined bit is placed in the first state in the case in which the interrupt is a hardware interrupt, and the second state in the case in which the interrupt is a software interrupt, or generated responsive to a trap condition.

FIG. 2 is a block diagram depicting a data structure 200 that may be used by an OEM or the like to identify the need for a software patch to replace error-containing code in an electronic device in the field or in the distribution chain. In one embodiment, this data structure represents data that is provided in a second memory, including but not limited to non-volatile RAM (NVRAM) 112, or ROM 114. In one example, an OEM stores this data in the second memory along with program code or data needed to provide additional features and functions to an electronic device, and then adds this second memory to an electronic device in the field or in distribution. In the case of a cordless handset, such additional features can include call forwarding, caller ID, speed dialing and the like. Because these additional functions or features are generally added to the device by the OEM after its manufacture, and the OEM will typically be adding a second memory to the device anyway to implement these features or functions, it is advantageous for the OEM to also add data structure 200 to this second memory assuming, of course, that it has been determined that one or more program errors exist in the program code resident in the first memory. In another example, these functions or features are provided to the device from a remote location through a telecommunications link to a second memory already present in the device. The telecommunications link may comprise a wireless link or another form of telecommunications link, such as telephone lines or the Internet. In this example, assuming again it has been determined that there are one or more bugs in the program code stored in the first memory, the data constituting data structure 200 would be provided to the second memory over the telecommunications link. In still another example, in a test mode, the data constituting data structure 200 could be entered by a user into the second memory through a key pad.

With reference to FIG. 2, data structure 200 comprises trap address 202, patch address 204, and patch code 208. The trap address 202 is the address of the beginning of a section in the first memory containing program code that has at least one program error or bug. The patch address 204 is the starting address of a section of memory containing the patch code 208, that is, the program code that is to be executed in place of the error-containing code section in the first memory. In the case in which the patch code is executed from the second memory, such as ROM 114, the patch address 204 is the starting address in the second memory at which the patch code resides. In the case in which the patch code is to be copied to a third memory, such as RAM 110, prior to execution thereof, the patch address 204 is the starting address in the third memory at which the patch code will reside upon execution thereof. The patch code 208 is the code segment which will be executed in lieu of the error-containing code.

FIG. 3 illustrates the destinations or locations to which the data items comprising data structure 200 are stored during the process of initializing the trap and patch function in one embodiment of the present invention. As shown in FIG. 3, the trap address 202 is stored in the holding circuit 134, the patch address 204 is stored in a predetermined vector 302, and the actual patch code 208 is optionally stored in a third memory such as RAM 110. In one implementation example, the predetermined vector is a predetermined location in RAM, but it should be appreciated that the vector can be implemented as a register, latch, flip-flop, storage element or device, and the like that is accessible by the microprocessor. As discussed previously, in one embodiment, the patch code 208 is executed from the second memory, and the step of transferring the patch code to the third memory is avoided, while, in another embodiment, the patch code 208 is copied to a third memory, and executed from this third memory.

Figure 4:
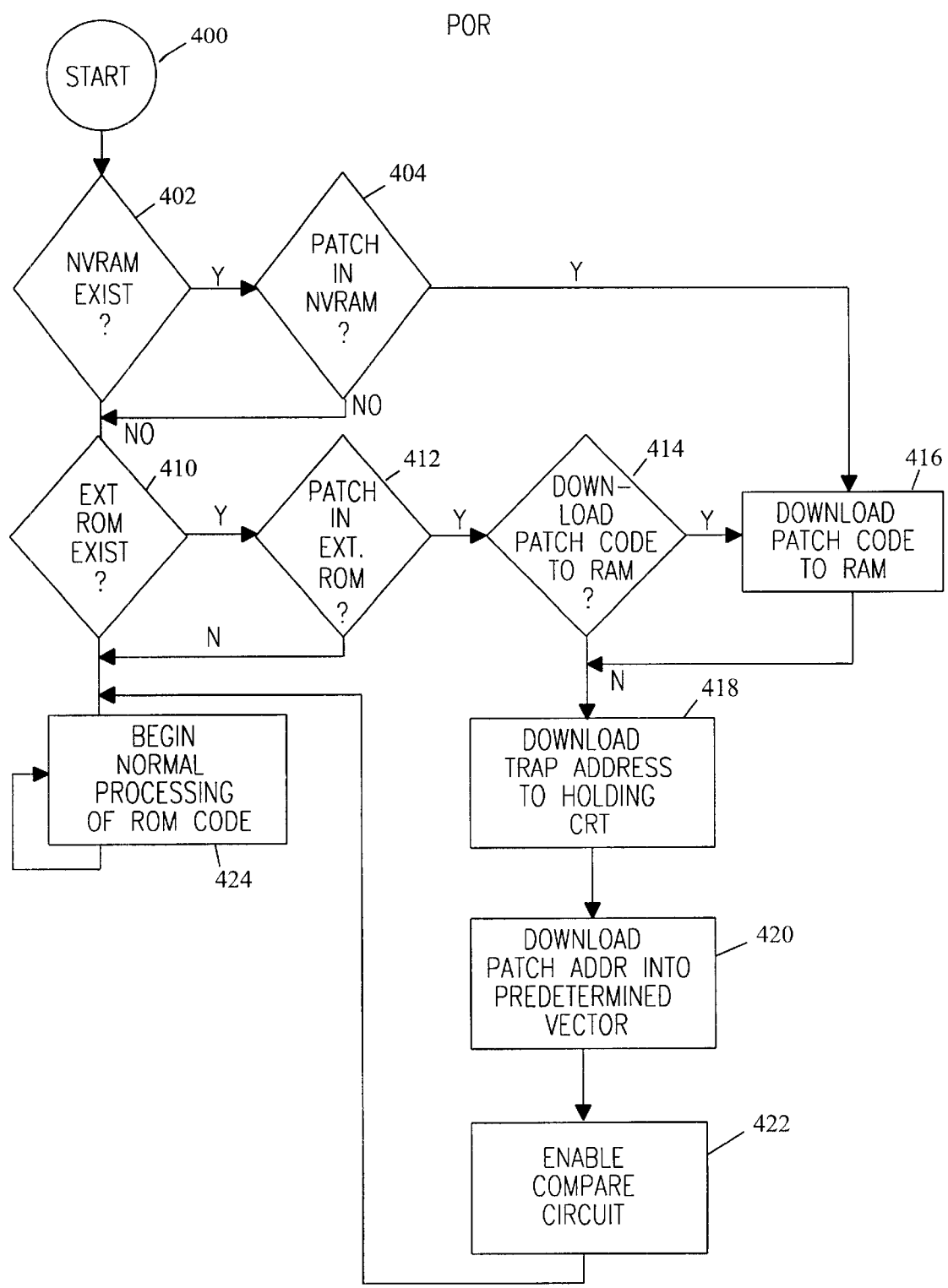
FIG. 4 is a flowchart of a power-on-reset ("POR") process, according to an embodiment of the present invention.
Figure 5:
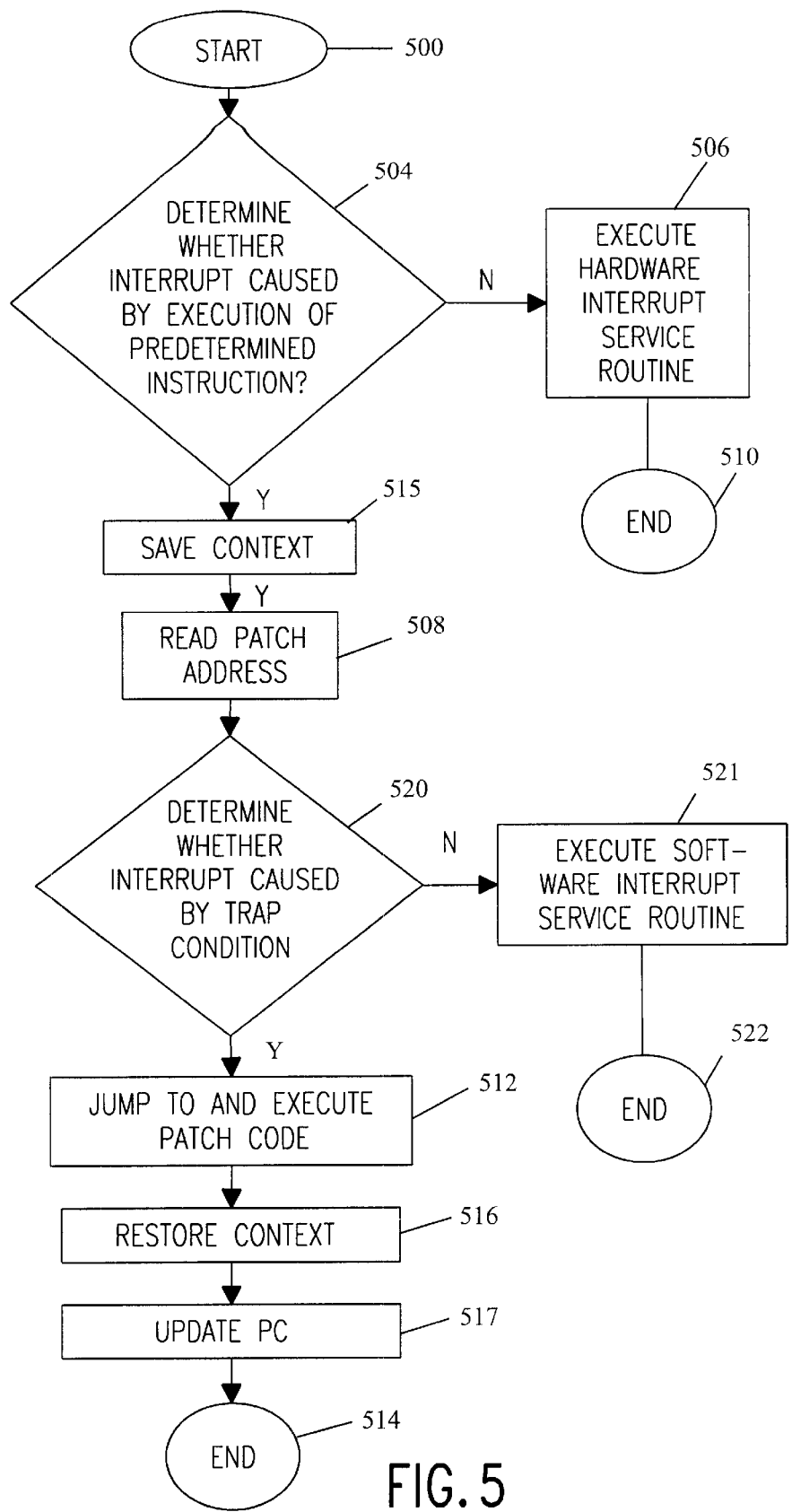
FIG. 5 is a flowchart depicting an example of a process that can be used as part of an interrupt service routine to respond to a trap condition according to an embodiment of the present invention.

An embodiment of an overall method of operation of the foregoing system will now be described. In one embodiment, the method has two parts. The first part comprises a process to initialize the trap and patch function of the present invention. The second part comprises a process to implement the trap and patch function of the present invention upon the occurrence of a trap condition. One embodiment of the first part is illustrated in FIG. 4. An embodiment of the second part is illustrated in FIG. 5.

With reference to FIG. 4, a process of initializing the trap and patch function upon the occurrence of a power-on-reset ("POR") condition is illustrated. The process begins at step 400, and proceeds to step 402. In step 402, the process determines whether NVRAM 112 exists, that is, has been added to the system of FIG. 1. In one example, it should be recalled that the NVRAM 112 may be supplied by an OEM or the like to provide additional features to the device, such as speed dialing and/or call forwarding. Thus, in this example, the NVRAM 112 may not always be present. This step may be implemented using a variety of means, including having the OEM set a switch to indicate the presence of NVRAM 112. In an alternative implementation, an internal flag stored in NVRAM 112 is used for this purpose.

In step 402, if it is determined that NVRAM 112 is present, control passes to step 404. In step 404, the process determines if the data structure 200 of FIG. 2 is present in the NVRAM 112. If so, control passes to step 416. If not, control passes to step 418. In step 416, in one embodiment, the patch code is copied to RAM 110 at the location beginning with patch address 204. In an alternate embodiment, the patch code is copied to RAM 110 at an arbitrary location in RAM 110. (In this case, the address of this arbitrary location is stored in the predetermined vector in step 420). Control then passes to step 418.

Turning back to step 402, if it is determined that NVRAM 112 is not present, control passes to step 410. In step 410, the process determines whether external ROM 114 is present. In one implementation, as discussed, the external ROM 114 is provided by an OEM to enhance or add to the features or functions of the electronic device. Thus, the external ROM 114 may not always be present. If the external ROM 114 is not present, control passes to step 424 and the normal POR process for the microprocessor is executed.

If, however, it is determined in step 410 that an external ROM 114 is present, control passes to step 412. In step 412, the process determines whether a data structure 200 is present in external ROM 114. If so, control passes to step 414. If not, control passes to step 424, and the normal POR process for the microprocessor executed. In step 414, in one embodiment, it is determined whether the patch code is to be copied to and executed from RAM 110 or executed from external ROM 114. If the patch code is to be copied to RAM, control is passed to step 416. If the patch code is not to be copied to RAM 110, but is to be executed from external ROM 114, step 416 is bypassed, and control is passed directly to step 418. In step 416, in one embodiment, the patch code is downloaded to RAM at a section beginning with patch address 204. In an alternate embodiment, the patch address 204 is not provided in the external ROM 114, and the patch code is stored beginning at an arbitrary location in RAM 110. (In this event, the address of the starting location at which the patch code is stored is provided to the predetermined vector in step 420). Control then passes to step 418.

In step 418, the trap address 204 is downloaded into the holding circuit 134. Next, control passes to step 420. In step 420, the patch address 204 is downloaded to a predetermined vector 302. In an alternate embodiment, the value loaded into vector 302 is determined "on the fly," that is, after the patch code has been stored in RAM 110. Next, in step 422, enable circuit 144 is activated, thus enabling the compare circuit 142, and possibly other circuits, such as holding circuit 134. Finally, in step 424, control passes to the normal POR routine of the microprocessor.

With reference to FIG. 5, an embodiment of a process of implementing the trap and patch function in accordance with the subject invention is illustrated. In this embodiment, upon the occurrence of a trap condition, a software interrupt instruction is placed on the data bus, and the predetermined bit in the PSR is placed in the second predefined state to indicate that the interrupt that will ensue resulted from the execution of the software interrupt instruction. Upon the execution of the software interrupt instruction, the microprocessor will automatically cause program control to begin executing an interrupt service routine. The foregoing process is part of this interrupt service routine.

The process begins at step 500, and control then passes to optional step 504. In optional step 504, a determination is made whether the interrupt was a hardware interrupt or caused by execution of the predetermined instruction. In a case in which hardware interrupts are routed to a different service routine, this step could be avoided, since the mere entry into the service routine indicates that the interrupt was caused by execution of the predetermined instruction.

In one implementation of step 504, the processor status register ("PSR") is read, and a determination made whether the predetermined bit of the PSR is in the second predefined state, indicating that the interrupt was generated responsive to the execution of a software interrupt instruction, or the first predefined state, indicating that the interrupt is a hardware interrupt. If the bit is in the first predefined state, control passes to step 506, upon which the hardware interrupt service routine is executed. Upon the completion of the hardware interrupt service routine, in step 510, control is returned to the point in the program code in ROM 108 immediately after the instruction that was executing when the interrupt occurred.

If however, it is determined in step 504 that the bit is in the second predefined state, control passes to step 515. In step 515, the current context of the microprocessor, that is the contents of the working registers, the PSR, the PC, and the like, are stored on a stack. In step 508, the patch address is obtained from predetermined vector 302.

The next step, step 520, is optional and need only be executed if software interrupts are supported. In step 520, a determination is made whether the interrupt is a software interrupt, that is, an interrupt generated by user placement of a software interrupt instruction in program code, or an interrupt generated responsive to a trap condition. In one implementation, this is accomplished by comparing the contents of the PC stored on the stack in step 515 with the patch address to determine if the address stored on the stack is the next sequential location following the patch address. If not, indicating that the interrupt is a software interrupt, a jump is made to step 521, in which the normal software interrupt service routine is executed. Upon the completion the normal software interrupt service routine, in step 522, context is restored from the stack, and control is resumed at the next sequential instruction following the software interrupt instruction that gave rise to the interrupt.

Turning back to step 520, if the address stored on the stack is the next sequential address following the patch address, indicating that the interrupt was generated responsive to a trap condition, program control is passed to step 512.

It should be appreciated that step 520 can be avoided if software interrupts are not supported. That is, in this case, the step is unnecessary because, after program control has passed to step 515, it can safely be assumed that the interrupt was generated responsive to a trap condition. It should also be appreciated that other methods are possible for detecting, in the case in which software interrupts are supported, whether the interrupt is a software interrupt or an interrupt generated responsive to a trap condition. According to one such method, a predetermined bit in the PSR or other register normally in a first predetermined state could be placed in a second predetermined state upon the occurrence of a trap condition. The bit could be interrogated in step 520 to determine whether the interrupt is a software interrupt or caused by a trap condition.

In step 512, the patch address is loaded into the PC, thus causing a jump to the patch code, and the patch code is then executed. Upon completion of the execution of the patch code, in step 516, the context of the microprocessor is selectively restored. The term "selectively" signifies that this step of restoring context is highly dependent on the intended functions performed by the patch code, and that the step of restoring the context of the microprocessor should be performed selectively so as not to interfere with or undue these functions. Consider, for example, patch code designed to compute a numerical value and store it in the accumulator of the microprocessor. Upon the conclusion of the execution of this patch code, it would not be desirable to restore the value of the accumulator that was stored on the stack in step 515 since that would interfere with the desired operation of the patch code. Thus, step 516 should be performed selectively to avoid interfering with the desired operation of the patch code, and the precise manner with which to achieve this objective should be apparent to one of skill in the art.

In step 517, the PC is updated with the location in ROM immediately after the last instruction of the error-containing code which is being replaced with the patch code, thus causing the microprocessor to jump to this location. This location will generally be distinct from the location immediately following the instruction which gave rise to the trap condition, and is easily determined from the starting address and size of the error-containing code. In step 514, the process ends, and program control is passed to the point in ROM after the error-containing code.

It should be appreciated that, in one embodiment in which the predetermined instruction placed on the data bus upon the occurrence of a trap condition is a software interrupt instruction, a mechanism is automatically provided with which to deal with the situation in which another interrupt, whether hardware or software, occurs during the process of implementing the trap and patch function. That is to say, in this example, an interrupt executed by the microprocessor will be assigned a certain priority, and a mechanism is automatically provided to mask out, that is ignore, interrupts of lower priority, and to provide for immediate execution of interrupts having a higher priority. In one implementation example, interrupts are classified as either maskable interrupts or non-maskable interrupts, and a predetermined bit in the PSR, an interrupt disable bit, is set to a logical "1" if maskable interrupts are to be ignored, and cleared to a logical "0" if maskable interrupts are to be immediately processed. If it is desired to ignore maskable interrupts during the execution of the process illustrated in FIG. 5, a step would be added at the beginning thereof in which the interrupt disable bit in the PSR is set to a logical "1", and another step would be added at the end of this process in which the bit is cleared.

In the event it were desired to have such interrupts immediately executed, these steps would be avoided. Then, upon the occurrence of a maskable interrupt during the execution of the process of FIG. 5, and assuming the interrupt disable bit is reset, such as during a POR process, the context of the processor, including the location in the process of FIG. 5 at which the interrupt occurred, would be saved on the stack, and the service routine for the interrupt then jumped to and executed. Upon completion of the execution of the service routine, context would be restored, and program control would resume at the location in the process of FIG. 5 at which the interrupt occurred.

In sum, in this implementation example, a mechanism is automatically provided for handling interrupts that may occur during the execution of the method for implementing the trap and patch function of the subject invention. Consequently, it is unnecessary to add specialized circuitry to perform this task.

EXAMPLE

Figure 6:
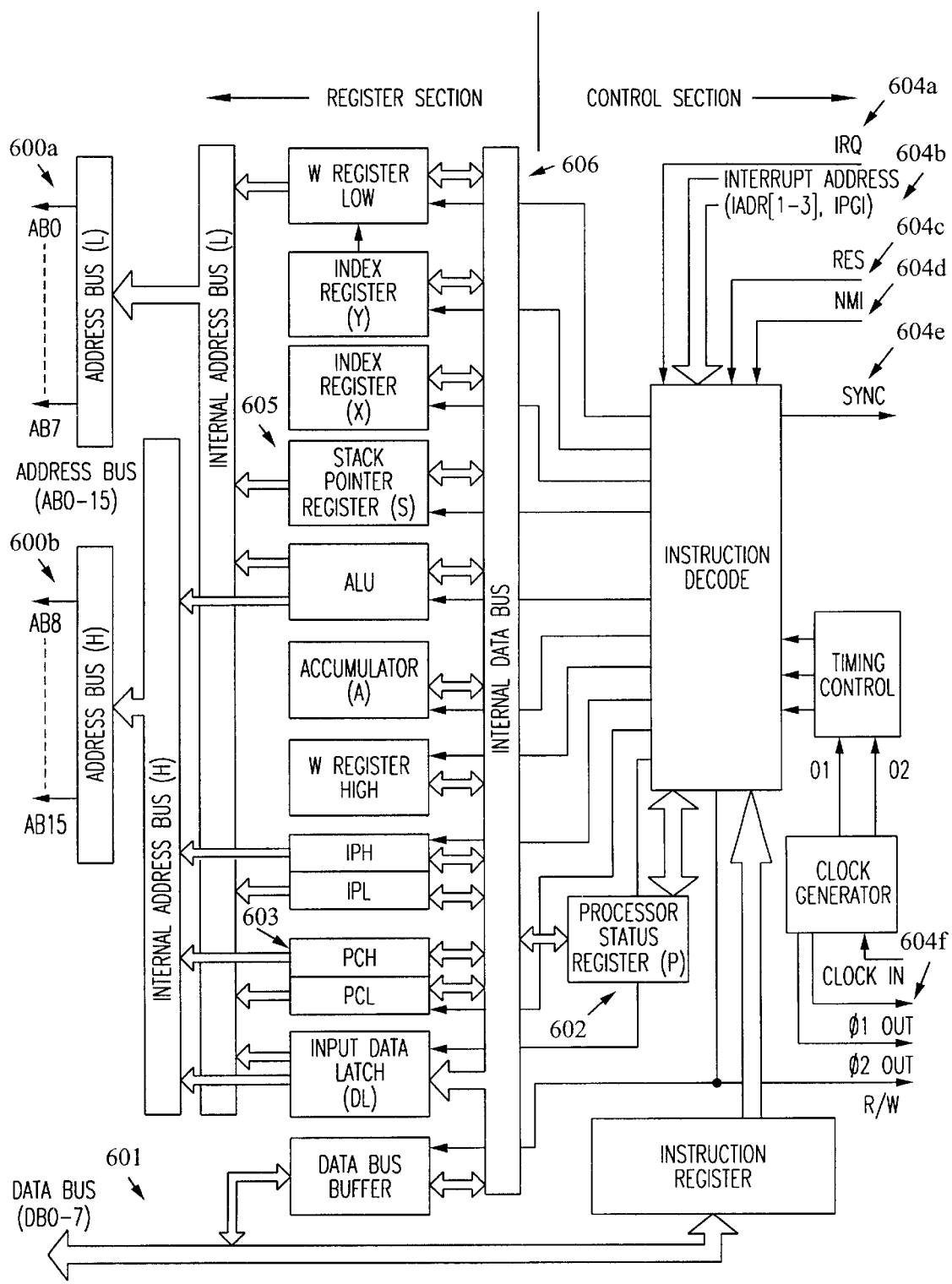
FIG. 6 illustrates the overall architecture of the Rockwell MC19 microprocessor.

An implementation example of the subject invention will now be described. In this example, the microprocessor is a Rockwell MC19 CMOS 8-bit microprocessor, a microprocessor which is software compatible with the Rockwell 65C02 microprocessor. The architecture of the MC19 is illustrated in FIG. 6. As indicated, the MC19 has a 16 bit external address bus, identified by numerals 600a and 600b, with numeral 600a identifying the low byte of the address bus, and numeral 600b identifying the high byte of the address bus. The external data bus of the MC19 is an 8 bit bus, identified with numeral 601. The program counter of the MC19 is identified with numeral 603. As indicated, the program counter is divided into a high byte, designated PCH, and a low byte, designated PCL, to achieve compatibility with the internal data bus 606, which is 8 bits wide. That is, the PC is divided into upper and lower bytes to allow the contents of the PC to be accessible over the internal data bus through successive byte transfers. The stack pointer ("SP") maintained by the MC19 is identified with numeral 605. The processor status register ("PSR") maintained by the MC19 is identified with numeral 602. The IRQ signal, identified with numeral 604a, is a maskable interrupt request signal, that is, it represents an interrupt request which is only recognized if the interrupt disable bit in the PSR indicates that maskable interrupts are enabled. The interrupt address signals, identified with numeral 604b, are typically asserted in conjunction with the IRQ signal. They are used to specify one of a plurality of interrupt vectors containing the address of an interrupt service routine for the particular interrupt which has given rise to the assertion of the IRQ signal. In response to the assertion of the IRQ signal, assuming maskable interrupts are enabled, the microprocessor obtains the address of an interrupt service routine from the interrupt vector specified by the interrupt address signals, and then executes this interrupt service routine. The RES signal, identified with numeral 604c, is a reset signal which is asserted upon a power-on or a reset condition. It causes the microprocessor to execute a power-on-reset ("POR") routine located in memory at a location specified by a predefined memory vector. The NMI signal, identified with numeral 604d, is a non-maskable interrupt signal, that is, it is recognized regardless of the state of the interrupt disable bit in the PSR. When asserted, it causes an interrupt service routine pointed to by an address in a predetermined memory vector to be executed. The SYNC signal, identified with numeral 604e, is a signal which is asserted when the MC19 is fetching an operation code of an instruction.

FIG. 7 illustrates the format of the PSR of the MC19. As indicated, the PSR has 8 bits. Bit 0 is the carry ("C") bit, and specifies whether the most recent arithmetic operation generated a carry or not. Bit 1 is the zero ("Z") bit, and specifies whether the most recent arithmetic operation resulted in a zero or not. Bit 2 is the interrupt disable ("I") bit, and specifies whether maskable interrupts are disabled or not. Bit 3 is a decimal mode ("D") bit, and specifies whether a decimal mode is selected or not. Bit 4, which is most relevant to the subject invention, is a break ("B") bit. It is used in conjunction with the MC19 BRK instruction, an instruction which generates a software interrupt. When set, it indicates that an interrupt was generated responsive to the execution of a BRK instruction. When reset, it indicates that the interrupt was generated responsive to the assertion of the IRQ signal. Bit 5 is unused. Bit 6 is the overflow ("V") bit, and specifies whether or not the most recent arithmetic operation resulted in an overflow condition. Finally, bit 7 is the negative ("N") bit, and specifies whether or not the most recent arithmetic operation gave rise to a negative result.

As indicated, in response to a RES condition, the N, V, Z, and C bits are not initialized while the I bit is set to a logical "1," representing the maskable interrupt disable state, while the D bit is reset to a logical "0," representing the selection of the binary mode.

FIG. 8 illustrates the instruction set of the MC19. Of most relevance to the subject invention is the BRK or break instruction, a single byte instruction having an op code of all zeroes, and having no operands. When decoded, the BRK instruction has the following bit pattern: 00000000. Functionally, when this instruction is executed, a software interrupt is generated. In addition, the B bit in the PSR is set to a logical "1." In response, the MC19 fetches the address of an interrupt service routine from $FFF0, which designates a predetermined memory vector at hexadecimal address $FFF0, saves the MC19 context on the stack, and then jumps to this interrupt service routine for execution thereof. Maskable interrupts, with an interrupt address vector of 000, are also serviced by the interrupt service routine pointed to by $FFF0. If such interrupts are supported, it may be necessary for the service routine to distinguish between such interrupts, and interrupts generated responsive to execution of the BRK instruction. In one implementation, to accomplish this, a check of the B bit is then made. If set to a logical "1," a procedure is executed to respond to the trap condition or software interrupt which caused the interrupt. Otherwise, the interrupt service process for responding to interrupts caused by assertion of the IRQ signal is executed. Upon completion of the interrupt service routine, in the case of an interrupt caused by assertion of the IRQ signal, program control is returned to a point immediately after the instruction which was executing when the interrupt occurred. In the case in which the interrupt is generated pursuant to a trap condition, program control is resumed at the location immediately following the error-containing code. In the case in which the interrupt is a software interrupt, program control is resumed at the location following the BRK instruction which caused the interrupt.

In the case in which interrupts generated by asserting the IRQ signal and for which the address vector is 000 are not supported, and the service routine pointed to by the vector $FFF0 is reserved exclusively for interrupts generated by execution of the BRK instruction, it is unnecessary for the service routine to check the B bit in the PSR.

Figure 15:
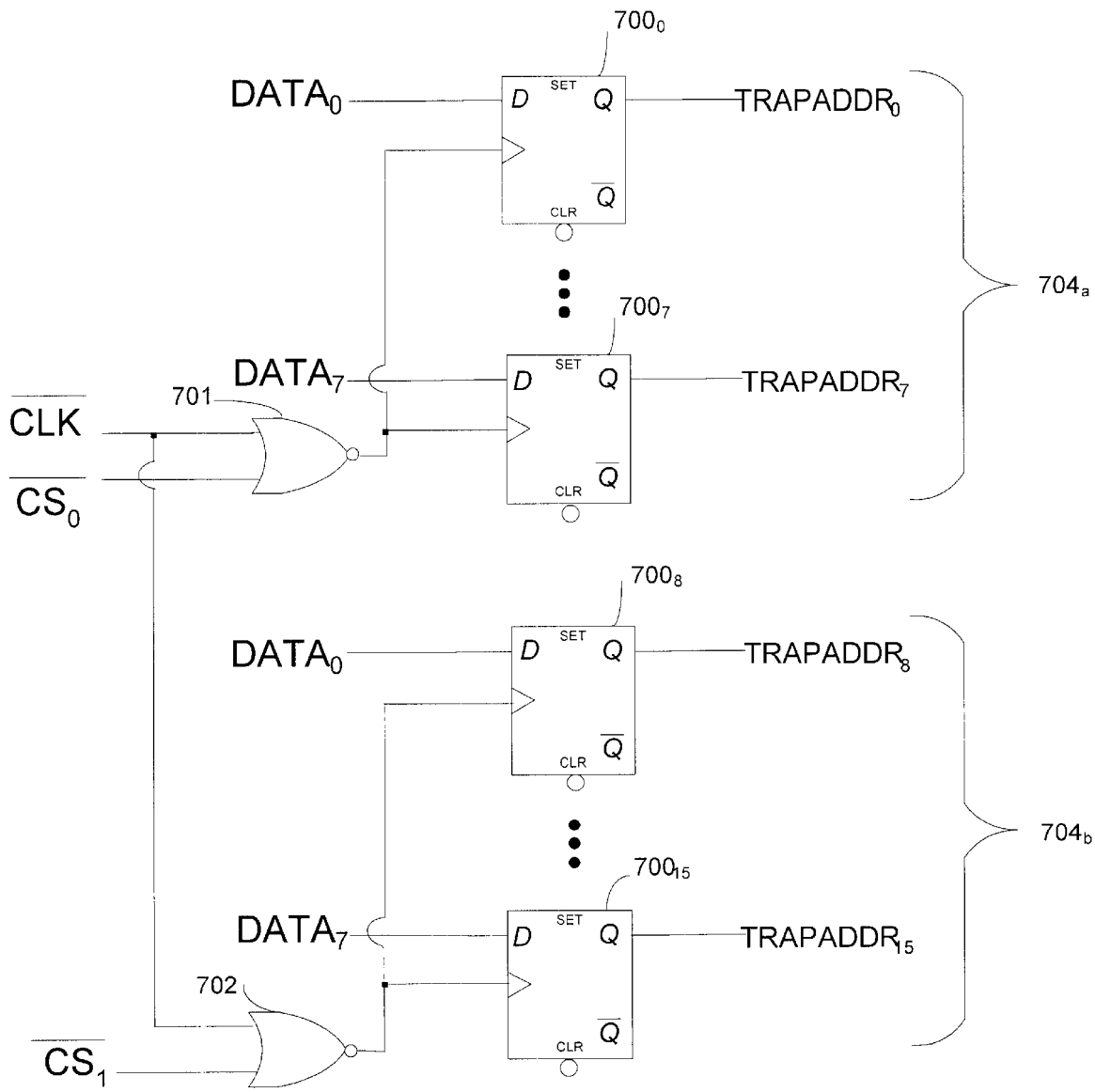
FIG. 15 is an example implementation of a holding circuit of the subject invention.

The environment in which the MC19 is expected to operate in this example is generally depicted in FIG. 1, with the MC19 serving as microcomputer 102. The holding circuit 134 in this example is illustrated in FIG. 15. Flip-flops $700_0$–$700_{15}$ are provided as shown. The Q outputs of these flip-flops, $TRAPADDR_0$–$TRAPADDR_{15}$, representing the beginning of the error-containing code which is to be replaced by the patch code, are input to compare circuit 142. To achieve compatibility with the 8 bit external data bus of the MC19, the holding circuit is divided into low byte portion 704a and high byte portion 704b. As shown, the data inputs of the flip-flops comprising the low byte portion are coupled to corresponding ones of the data bus 106, identified in FIG. 15 as $DATA_0$–$DATA_7$, and the data inputs of the flip-flops comprising the high byte portion are also coupled to corresponding ones of the data bus 106, identified in FIG. 15 as $DATA_0$–$DATA_7$. In this example, enable circuit 144 is also a flip-flop, the output of which, the ENABLE signal, is a logical "1" if the trap and patch function is enabled, and a logical "0" if the trap and patch function is disabled.

The clock inputs of the flip-flops comprising the low byte portion are coupled to the output of NOR gate 701, and the clock inputs of the flip-flops comprising the high byte portion are coupled to the output of NOR gate 702. A clock input, designated /CLK in FIG. 15, is coupled to one input of the NOR gates 701 and 702. The other input of NOR gate 701 is coupled to a first chip select signal, designated $/CS_0$ in FIG. 15, which is used to select the low byte portion of the holding circuit. The other input of NOR gate 702 is coupled to a second chip select signal, designated $/CS_1$ in FIG. 15, which is used to select the high byte portion of the holding circuit. In this manner, when it is desired to load the low byte of the trap address into the holding circuit from the data bus, the $/CS_0$ signal is asserted (low), and when it is desired to load the high byte portion of the trap address into the holding circuit from the data bus, the $/CS_1$ signal is asserted (low).

Figure 14:
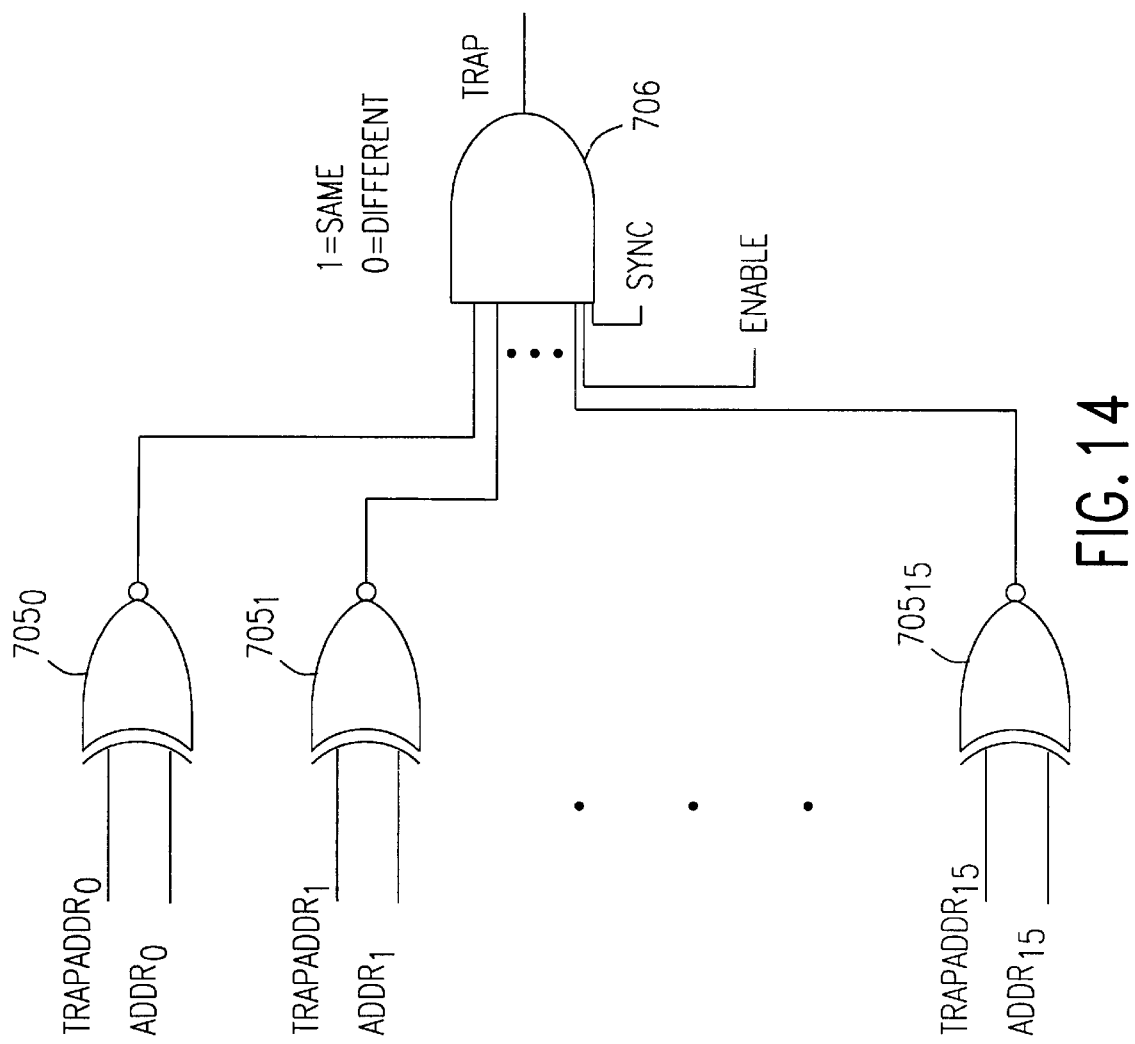
FIG. 14 is an example implementation of a compare circuit of the subject invention.

The compare circuit 142 in this example is illustrated in FIG. 14. As can be seen, the circuit comprises XNOR gates $705_0$–$705_{15}$, with the inputs thereof being corresponding ones of the outputs of the holding circuit 134, $TRAPADDR_0$–$TRAPADDR_{15}$, and corresponding bits of the external address bus, identified as $ADDR_0$–$ADDR_{15}$ in the figure. As shown, the outputs of the XNOR gates are input to AND gate 706. Also input to the AND gate 706 are the ENABLE and SYNC signals. The output of the AND gate 706 is the trap condition signal, TRAP, which will be a logical "1" when the trap address stored in the holding circuit is equal to the address on the address bus, and the ENABLE and SYNC signals are active. Otherwise, this output will be a logical "0".

The disable first memory switch 128 and disable first memory circuit 148 in this example is the /CS pin, that is, the chip select pin, and related circuitry, of the ROM 108. In this implementation, the /CS input of ROM 108 is deasserted, that is, kept high, during the single cycle the BRK instruction is placed on the data bus responsive to a TRAP condition. That way, the ROM 108 is decoupled from the data bus to avoid conflict with the predetermined instruction circuit 104.

Figure 16:
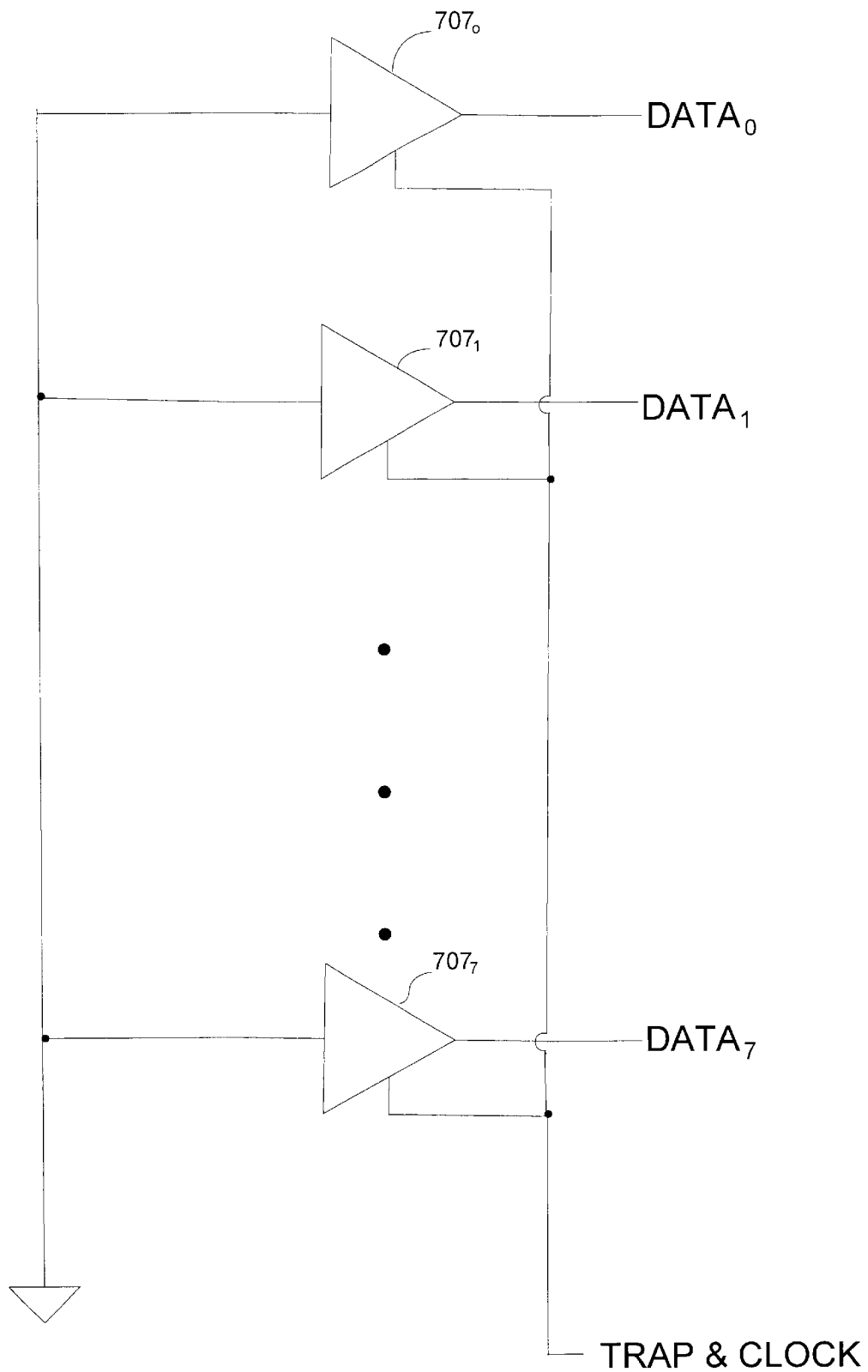
FIG. 16 is an example implementation of a predetermined instruction circuit of the subject invention.

The predetermined instruction circuit in this example is, as illustrated in FIG. 16, a plurality of tri-state buffers, identified with numerals $707_0$–$707_7$, the data inputs of which are tied to ground, and the data outputs of which are tied to corresponding lines of the external data bus, $DATA_0$–$DATA_7$. The control inputs of these buffers is tied to a control signal, which is the logical AND of TRAP and CLOCK, the clock output of the MC19. (In FIG. 6, the clock output, Ø1, is identified with numeral 604f.) This control signal is formed from a logical combination of TRAP and CLOCK to provide the instruction on the data bus for the single cycle, which is sufficient for the MC19 to recognize a BRK instruction.

Figure 9:
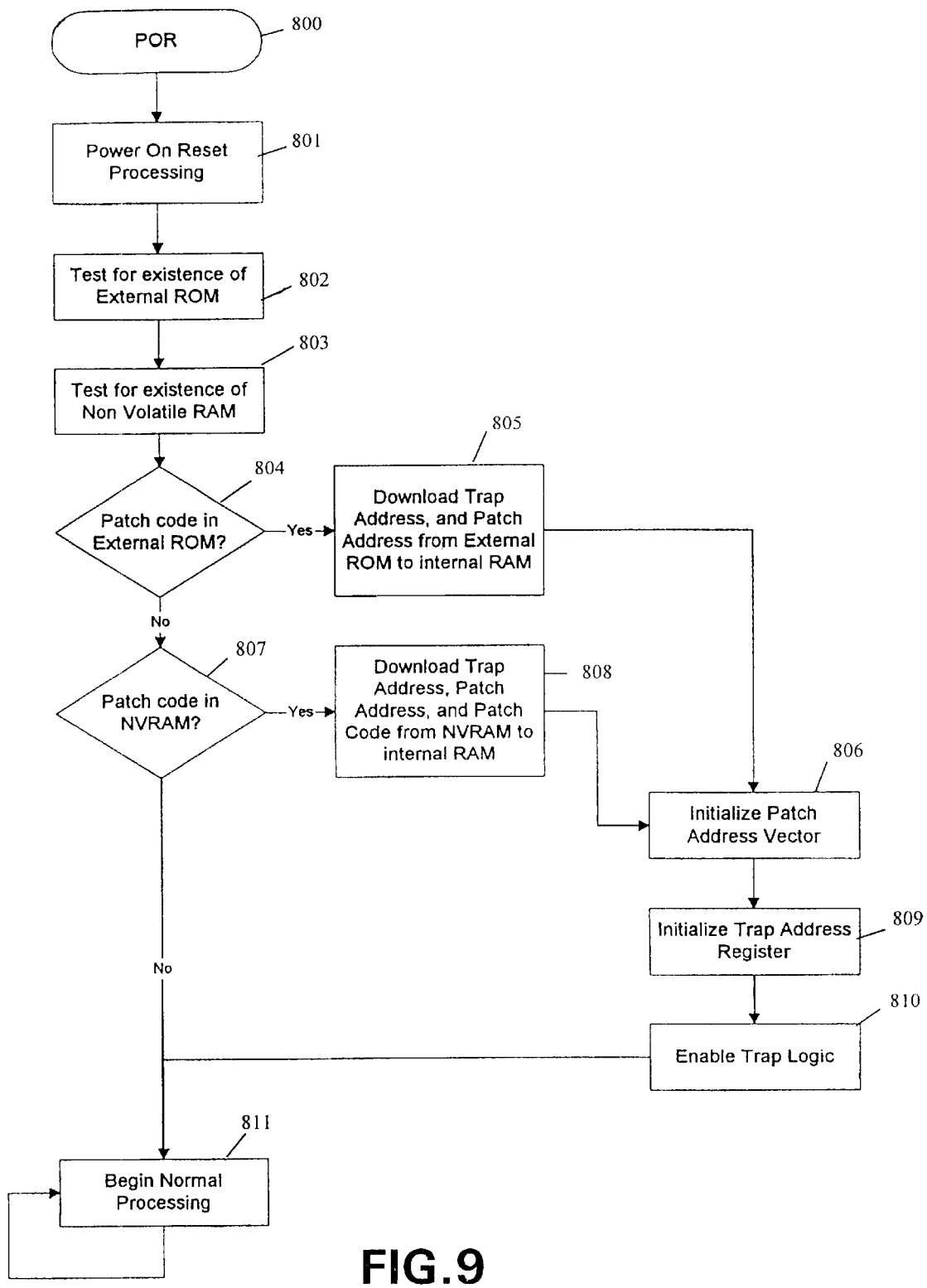
FIG. 9 illustrates an example implementation of a method of initializing a trap and patch function in accordance with the subject invention.

In this example, a method of initializing the trap and patch function is part of the POR routine. Such a method is illustrated in FIG. 9. As indicated, in step 800, the POR routine is initiated. In step 801, the normal initialization and set-up procedures which are normally executed as part of the POR routine are executed. One such step is the loading into $FFF0 of the address of a software interrupt service routine which, in this example, is located in internal ROM 108. In step 802, a test is made for the presence of external ROM, and in step 803, for the presence of NVRAM, which in this example, is typically EEPROM. Again, in this example, the external ROM and NVRAM are typically added by an OEM for the purpose of adding functionality to an electronic device such as a cordless handset. In step 804, if external ROM is present, a test is made for the existence in the external ROM of the data structure of FIG. 2. If present, in step 805, the trap address and the patch address are downloaded to internal RAM. In this example, the patch code is executed from external ROM, and the patch address is the starting address of this patch code in external ROM. Control then passes to step 806.

Turning back to step 804, if external ROM is not present, or, if present, the data structure of FIG. 2 is not located therein, control is passed to step 807. In step 807, a test is made in NVRAM for the presence of the data structure of FIG. 2. (In this example, NVRAM is assumed to already be present in a system comprising the MC19 coupled to internal ROM, internal RAM, and the NVRAM over an address and data bus). If present, in step 808, the trap address, the patch address, and the patch code are downloaded to internal RAM. (In this example, the patch code is executed from internal RAM because execution from NVRAM is considered to be too slow due to the serial nature of that device, and the patch address is the starting address of the patch code in internal RAM.) Control then passes to step 806.

In step 806, the patch address is loaded into a predetermined vector which, in this example, is in internal RAM. In step 809, the trap address is loaded into the holding circuit. Then, in step 810, the enable circuit is activated. This, in turn, activates the control circuit and thus allows the trap condition signal to be asserted. In addition, in this example, the holding circuit is activated in that the clear input to the flip-flops thereof are lifted, allowing the trap address to be stored therein.

At this point, initialization of the trap and patch function is completed. Accordingly, in step 811, normal processing of the microprocessor begins.

Figure 10:
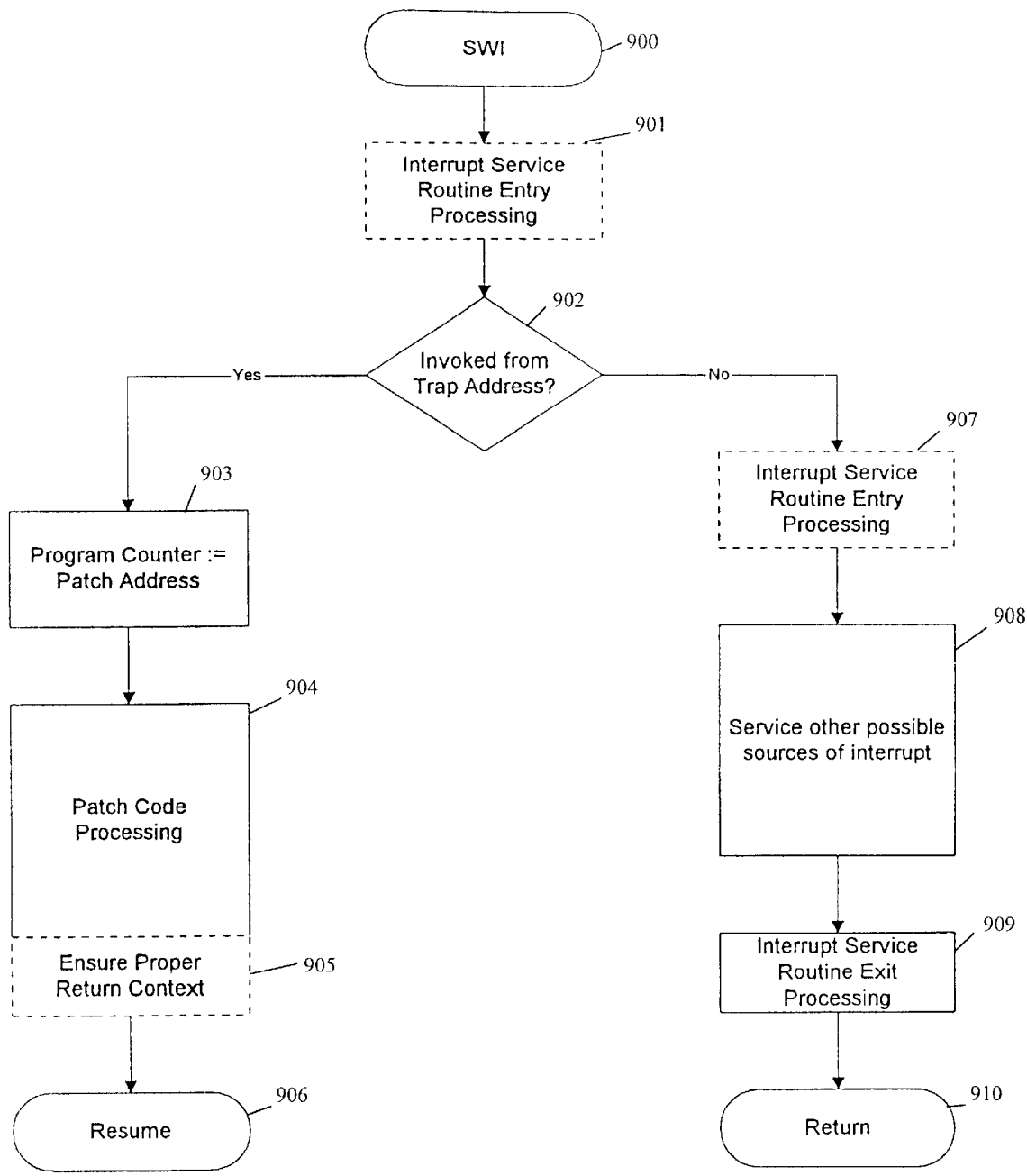
FIG. 10 illustrates an example implementation of a method of implementing a trap and patch function in accordance with the subject invention.

A method of implementing the trap and patch function responsive to the assertion of a trap condition signal in this example is illustrated in FIG. 10. As discussed, in this example, responsive to the assertion of a trap condition signal, the predetermined instruction circuit 104 places for execution on the data bus in a single cycle a single byte containing the op code of the BRK instruction. In addition, in this example, the B bit of the PSR, bit 4, is set to a logical "1," thus indicating that the interrupt was generated responsive to the execution of the BRK command. Since the op code of the BRK instruction in this example is all zeroes, and the BRK instruction lacks any operands, the value 00000000 is placed on the data bus in a single cycle. When the microprocessor executes the BRK instruction, an interrupt is generated.

With reference to FIG. 10, responsive to the occurrence of the interrupt, represented by step 900, program control passes to step 901 in which certain set-up procedures are performed. More specifically, the address of the interrupt service routine is retrieved from $FFF0 and loaded into the PC, and certain elements of the MC19 context are saved on the stack. The box designating step 901 in FIG. 10 is dashed to signify that the foregoing set up procedures are implemented in hardware rather than software.

These set-up tasks are illustrated in FIG. 11 in the case in which the interrupt is generated responsive to forcing a BRK instruction on the data bus responsive to a TRAP condition. As indicated, in cycle 1, a certain instruction is being executed, while a fetch of the next instruction, assumed to be at location $2200, is made. A trap condition is assumed to arise because of the fetch of this next instruction. Next, in cycle 2, a BRK instruction is forced onto the data bus responsive to the occurrence of the trap condition. In cycle 3 and 4, the contents of the PC are stored onto the stack. First, the high byte of the PC, PCH, is placed onto the stack, followed by the low byte of the PC, PCL. (As indicated, prior to placement of the PC onto the stack, the stack pointer is assumed to be pointing to location $01FF.) Next, in cycle 5, the contents of the PSR are placed onto the stack. Then, in cycles 6 and 7, the start address of the software interrupt service routine is obtained from the predetermined vector located at $FFF0, and loaded into the PC, thus causing program control to jump to the interrupt service routine. As indicated, first, the low byte of the address is retrieved and loaded into PCL. Then, the high byte of the address is retrieved and loaded into PCH. Finally, in cycle 8, the execution of the interrupt service routine is initiated.

With reference to FIG. 10, control then passes to step 902. In this step, a determination is made whether the interrupt was caused by a trap condition. In one example, in which software interrupts are not supported, this step is accomplished simply by determining the status of bit 4 of the PSR. According to this example, if the B bit of the PSR is set, then the interrupt was caused by the trap condition, while if it is reset, then the interrupt was caused by assertion of the IRQ signal. If set, control passes to step 903, while, if not, control passes to step 907. In step 907, certain additional set-up tasks, unique to the case in which the interrupt is generated responsive to assertion of the IRQ signal in contrast to a trap condition, are performed in hardware. Then, in step 908, the interrupt is serviced. In step 909, certain exit processing tasks are performed, including restoring from the stack the PSR which was present upon the occurrence of the interrupt. Finally, in step 910, program control is returned to the instruction immediately following the instruction which was executing when the interrupt occurred.

Turning back to step 902, if the interrupt is generated responsive to the occurrence of a trap condition, control is passed to step 903. There, the patch address is retrieved from the predetermined vector designated for storage of the patch address, in this example, a RAM vector, and loaded into the PC. Thus, a branch or jump to the patch code is executed with only the use of combinational logic.

In step 904, the step of selectively saving on the stack additional context of the microprocessor, such as the contents of selected ones of the registers illustrated in FIG. 6, that is, selected ones of the W register, index (Y) register, ALU, accumulator or A register, and the like, is executed. Unlike steps 901 and 907, in this example, this step is performed in software.

The body of the patch code is then executed. At the conclusion of the execution of the body of the patch code, in step 905, certain exit tasks are performed, including selective restoration of the contents of the working registers from the values stored on the stack. As discussed previously, this step is performed selectively to avoid interfering with the intended objective of the patch code. In this example, these tasks are performed in hardware, signified by the dashed box representing step 905 in FIG. 10. Such tasks include restoration of the PSR from the stack.

In step 906, the address of the location in internal ROM immediately following the error-containing code is determined and loaded into the PC, thus causing a jump to this location. In addition, the internal ROM is re-enabled. Note that this address is not necessarily the value of the PC stored on the stack in step 901. That is to say, the value stored on the stack in step 901 is the address of the location immediately following that which gave rise to the trap condition, which is generally different from the address of the location immediately following the error-containing code at which program control resumes pursuant to step 906. This address would be apparent to one of skill in the art based on the address of the location at which the trap condition occurred, that is, the trap address, and the length of the error-containing code segment.

A listing of the actual code used to implement the method of FIG. 9 in this example is provided in FIGS. 12a, 12b, and 12c, while that used to implement the portion of the method of FIG. 10 which is configured to respond to the trap condition (the left branch of FIG. 10) is provided in FIG. 13.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for implementing a trap and patch function comprising:
   a processor;
   at least one memory accessible by the processor over a bus system on which is stored a routine which, upon execution thereof by the processor, causes a patch code segment to be executed in place of an error-containing code segment;
   first circuitry for detecting an attempted access by the processor to the error-containing code, and responsive thereto, signaling a trap condition; and
   second circuitry comprising solely combinational circuitry for placing on the bus system, responsive to the signaling of the trap condition, a predetermined instruction configured such that, upon execution thereof by the processor, program control is passed to the routine.

2. The apparatus of claim 1 in which the predetermined instruction is a software interrupt instruction.

3. The apparatus of claim 1 in which the second circuitry configured to place on the bus system the predetermined instruction in a single cycle.

4. The apparatus of claim 1 in which the routine has a start address stored in a predetermined vector and the processor is configured, upon execution of the predetermined instruction, to access the start address as stored in the predetermined vector, and jump to the start address of the routine.

5. The apparatus of claim 1 in which the patch code segment has a start address stored in a predetermined vector and the processor is configured, upon execution of the routine, to access the start address as stored in the predetermined vector, and jump to the start address of the patch code.

6. The apparatus of claim 1 in which the predetermined instruction lacks any operands.

7. The apparatus of claim 2 in which a predetermined bit in a register is used by the routine to distinguish between an interrupt due to a trap condition and another condition.

8. The apparatus of claim 7 in which the processor has a PSR and the register is the PSR.

9. The apparatus of claim 1 in which the patch code segment is provided in a first memory and executed from a second memory.

10. The apparatus of claim 1 in which the patch code segment is provided in a first memory and executed from a second memory if the first memory is NVRAM.

11. The apparatus of claim 1 in which the patch code is provided in a first memory and executed from the first memory if the first memory is ROM.

12. The apparatus of claim 1 in which a data structure comprising a trap address and the patch code segment are provided in a memory.

13. The apparatus of claim 12 in which the trap and patch function is enabled only if the data structure is present in the memory.

14. The apparatus of claim 1 in which the error-containing code segment has a start address, the bus system has an address bus, and the first circuitry comprises:
   a holding circuit for holding the start address of the error-containing code segment; and
   a compare circuit coupled to the holding circuit and the address bus configured to signal a trap condition if there is a match between the start address in the holding circuit and values placed on the address bus by the processor.

15. The apparatus of claim 1 in which the error-containing code is stored in a first memory, and the apparatus further comprises third circuitry for, pursuant to the signaling of a trap condition, disconnecting the first memory from the bus system.

16. An apparatus for implementing a trap and patch function comprising:
   a processor;
   a storage element having a predetermined bit capable of being placed in first and second states;
   at least one memory accessible by the processor over a bus system on which is stored a routine which, upon execution thereof by the processor, tests the predetermined bit in the storage element, and causes a patch code segment to be executed in place of an error-containing code segment only if the predetermined bit in the storage element is in the second state;

first circuitry for detecting an attempted access by the processor to the error-containing code, and, responsive thereto, signaling a trap condition;

second circuitry for, responsive to the signaling of the trap condition, placing the predetermined bit in the storage element in the second state; and third circuitry for, responsive to the signaling of the trap condition, placing on the bus system a predetermined instruction configured such that, upon execution thereof by the processor, program control is passed to the routine.

17. The apparatus of claim 15 in which the routine, upon execution thereof by the processor, passes control to another routine which is executed if the predetermined bit in the storage element is in the first state.

18. The apparatus of claim 16 in which the storage element is a register.

19. The apparatus of claim 16 in which the processor has a PSR and the storage element is the PSR.

20. The apparatus of claim 16 in which the predetermined instruction is a software interrupt instruction and the routine is an interrupt service routine.

21. A method of initializing a trap and patch function comprising:

adding a first memory to a processor system comprising a processor coupled to a second memory over a bus system, the first memory configured to add a function to an electronic device in addition to the trap and patch function;

checking for the presence in the first memory of a data structure including a patch code segment; and if the data structure is present, enabling the trap and patch function.

22. The method of claim 21 in which the checking and enabling steps thereof are performed responsive to a POR condition.

23. The method of claim 21 in which the data structure further includes a trap address, and the method further comprises loading the trap address into a holding circuit if the data structure is present in the first memory.

24. The method of claim 21 wherein the data structure further includes a patch address, and the method further comprises loading the patch address into a predetermined vector if the data structure is present in the first memory.

25. The method of claim 21 further comprising loading the patch code into a second memory if the first memory is NVRAM.

26. A method of implementing a trap and patch function in a system comprising a processor coupled to at least one memory over a bus system, the method comprising:

detecting a trap condition upon an attempted access by the processor of an error-containing code segment in at least one memory, and, responsive thereto, performing the following steps:

providing on the bus system a predetermined instruction for execution by the processor;

having the processor execute the predetermined instruction;

having the processor distinguish between a trap condition and either a software or hardware interrupt; and if a trap condition is recognized, having the processor execute in place of the error-containing code segment a patch code segment.

27. The method of claim 26 in which the bus system includes an address bus, and the step of detecting the trap condition comprises comparing a trap address with values placed on the address bus by the processor.

28. The method of claim 26 in which the predetermined instruction comprises a software interrupt instruction.

29. A method of implementing a trap and patch function in a system comprising a processor coupled to at least one memory over a bus system and a storage element having a predetermined bit with a first state and a second state, the method comprising:

detecting a trap condition upon an attempted access by the processor of an error-containing code segment in at least one memory, and, responsive thereto, performing the following steps:

putting the predetermined bit in the storage element in the second state;

providing on the bus system in a single cycle a predetermined instruction for execution by the processor;

having the processor execute the predetermined instruction; and in response thereto, having the processor execute in place of the error-containing code segment a patch code segment only if the predetermined bit is in the second state.

30. The method of claim 29 in which the storage element is a register.

31. The method of claim 29 in which the processor has a PSR, and the storage element is the PSR.

32. The method of claim 29 further comprising executing another routine if the predetermined bit in the storage element is in the first state.

* * * * *